(12) United States Patent
Park et al.

(10) Patent No.: US 11,902,214 B2
(45) Date of Patent: Feb. 13, 2024

(54) APPARATUS AND METHOD FOR DETERMINING MAXIMUM TRANSPORT BLOCK SIZE IN COMMUNICATION SYSTEM

(71) Applicant: Samsung Electronics Co., Ltd., Suwon-si (KR)

(72) Inventors: Sungjin Park, Suwon-si (KR); Seho Myung, Suwon-si (KR); Younsun Kim, Suwon-si (KR); Hyunseok Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 17/687,151

(22) Filed: Mar. 4, 2022

(65) Prior Publication Data

US 2022/0294593 A1    Sep. 15, 2022

(30) Foreign Application Priority Data

Mar. 5, 2021    (KR) .................. 10-2021-0029704

(51) Int. Cl.
*H04L 5/00*    (2006.01)

(52) U.S. Cl.
CPC .......... *H04L 5/0064* (2013.01); *H04L 5/0016* (2013.01); *H04L 5/0053* (2013.01)

(58) Field of Classification Search
CPC ... H04L 5/0064; H04L 5/0016; H04L 5/0053; H04L 1/1819; H04L 1/0016;

(Continued)

(56) References Cited

U.S. PATENT DOCUMENTS 11,109,363 B2\* 8/2021 Huang ................. H04L 1/1896
2019/0200330 A1\* 6/2019 Wikström ............ H04W 72/23
(Continued)

FOREIGN PATENT DOCUMENTS

KR    10-2021-0126479 A    10/2021
WO       2013/022310 A2    2/2013

OTHER PUBLICATIONS

Sharp, TB processing over multi-slot PUSCH, R1-2101546, 3GPP TSG RAN WG1 #104-e, e-Meeting, Jan. 19, 2021.
(Continued)

*Primary Examiner* — Afshawn M Towfighi
(74) *Attorney, Agent, or Firm* — Jefferson IP Law, LLP

(57) ABSTRACT

A method performed by a user equipment (UE) in a wireless communication system is provided. The method includes transmitting, to a base station, capability information of the UE, and receiving configuration information associated with a transport block size (TBS). The TBS is determined based on a value of $N_{RE} \cdot R \cdot Q_m \cdot v$. The $N_{RE}$ corresponds to a number of allocated resource elements, the R corresponds to a code rate, and the $Q_m$ corresponds to a modulation order, and the v corresponds to a number of allocated layers. A maximum value of the TBS is considered for transport block over multiple slots (TBoMS), and the maximum value of the TBS is determined by limiting at least one of a value of the $N_{RE}$, the R, the $Q_m$, or the v.

12 Claims, 9 Drawing Sheets

(58) Field of Classification Search
CPC ... H04L 1/0023; H04L 1/0061; H04L 1/0067; H04L 1/08; H04L 1/1874; H04L 1/0057; H04L 5/0092; H04L 5/0044; H04L 1/0013; H04L 5/0007; H04W 8/24
See application file for complete search history.

(56) References Cited

U.S. PATENT DOCUMENTS

2021/0329614 A1* 10/2021 Park .................. H04L 27/34
2022/0045789 A1*  2/2022 Karmoose ......... H04W 72/1268

OTHER PUBLICATIONS

CATT, Discussion on TB processing over multi-slot PUSCH, R1-2100398, 3GPP TSG RAN WG1 Meeting #104-e, e-Meeting, Jan. 19, 2021.
LG Electronics, Discussions on TB processing over multi-slot PUSCH, R1-2100713, 3GPP TSG RAN WG1 #104-e, e-Meeting, Jan. 19, 2021.
International Search Report and Written Opinion dated Jun. 14, 2022, issued in International Patent Application No. PCT/KR2022/003221.

* cited by examiner

APPARATUS AND METHOD FOR DETERMINING MAXIMUM TRANSPORT BLOCK SIZE IN COMMUNICATION SYSTEM

CROSS-REFERENCE TO RELATED APPLICATION(S)

This application is based on and claims priority under 35 U.S.C. § 119(a) of a Korean patent application number 10-2021-0029704, filed on Mar. 5, 2021, in the Korean Intellectual Property Office, the disclosure of which is incorporated by reference herein in its entirety.

BACKGROUND

1. Field

The disclosure relates to a communication system. More particularly, the disclosure relates to a method and an apparatus for transmitting and receiving data and control information in a communication system.

2. Description of the Related Art

To meet the demand for wireless data traffic having increased since deployment of 4th Generation (4G) communication systems, efforts have been made to develop an improved 5th Generation (5G) or pre-5G communication system. Therefore, the 5G or pre-5G communication system is also called a 'Beyond 4G Network' or a 'Post Long-Term Evolution (LTE) System'.

The 5G communication system is considered to be implemented in ultra-high frequency (millimeter (mm) Wave) bands, (e.g., 60 gigahertz (GHz) bands), so as to accomplish higher data rates. In order to mitigate pathloss of radio waves and increase a propagation distance of radio waves in an ultra-high frequency band, beamforming, massive multiple-input and multiple-output (MIMO), full-dimensional MIMO (FD-MIMO), array antenna, analog beamforming, and large-scale antenna technologies have been discussed in 5G communication systems.

In addition, in order to improve a network of a 5G communication system, technologies such as evolved small cells, advanced small cells, cloud radio access networks (cloud RANs), ultra-dense networks, device-to-device (D2D) communication, wireless backhaul, moving networks, cooperative communication, Coordinated Multi-Points (CoMP), and interference cancelation, have been developed.

In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

As a wireless communication system such as a 5G system evolves, it is expected that various services may be provided. Therefore, there is a need for a method of seamlessly providing these services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively determining the size of a transport block in a wireless or wired communication system.

Another aspect of the disclosure is to provide an apparatus and a method for effectively determining the size of a code block in a wireless or wired communication system.

Another aspect of the disclosure is to provide an apparatus and a method for effectively performing rate matching in a wireless or wired communication system.

Another aspect of the disclosure is to provide an apparatus and a method for limiting transmittable parity bits in a wireless or wired communication system.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes transmitting, to a base station, capability information of the UE, and receiving configuration information associated with a transport block size (TBS), wherein the TBS is determined based on a value of $N_{RE} \cdot R \cdot Q_m \cdot v$, and wherein the $N_{RE}$ corresponds to a number of allocated resource elements, the R corresponds to a code rate, and the $Q_m$ corresponds to a modulation order, and the v corresponds to a number of allocated layers, wherein a maximum value of the TBS is considered for transport block over multiple slots (TBoMS), and wherein the maximum value of the TBS is determined by limiting at least one of a value of the $N_{RE}$, the R, the Q, or the v.

A maximum value of the $N_{RE}$ may be determined based on at least one of a frequency or a subcarrier spacing.

The $N_{RE}$ may correspond to min $(156, N_{RE}') \cdot n_{PRB}$, and the $N_{RE}'$ may correspond to $N_{sc}^{RB} \cdot N_{symb}^{sh} - N_{DMRS}^{PRB} - N_{oh}^{PRB}$, and the $N_{sc}^{RB}$ may correspond to a number of subcarriers included in one resource block, the $N_{symb}^{sh}$ may correspond to a number of orthogonal frequency division multiplexing (OFDM) symbols allocated to a physical downlink shared channel (PDSCH), the $N_{DMRS}^{PRB}$ may correspond to a number of resource elements included in one physical resource block (PRB), the $N_{oh}^{PRB}$ may correspond to a number of resource elements occupied by overhead in the one PRB, and $n_{PRB}$ may correspond to a number of PRBs allocated to the PDSCH in a slot.

The maximum value of the $N_{RE}$ may be determined based on a maximum value of the $n_{PRB}$.

In accordance with another aspect of the disclosure, an UE in a wireless communication system is provided. The UE includes a transceiver, and at least one processor coupled with the transceiver and configured to transmit, to a base station, capability information of the UE, and receive configuration information associated with a transport block size (TBS), wherein the TBS is determined based on a value of $N_{RE} \cdot R \cdot Q_m \cdot v$, wherein the $N_{RE}$ corresponds to a number of allocated resource elements, the R corresponds to a code rate, and the $Q_m$ corresponds to a modulation order, and the v corresponds to a number of allocated layers, wherein a maximum value of the TBS is considered for transport block over multiple slots (TBoMS), and wherein the maximum value of the TBS is determined by limiting at least one of a value of the $N_{RE}$, the R, the $Q_m$, or the v.

A maximum value of the $N_{RE}$ may be determined based on at least one of a frequency or a subcarrier spacing.

The $N_{RE}$ may correspond to min (156, $N_{RE}'$)·$n_{PRB}$, and the $N_{RE}'$ may correspond to $N_{sc}^{RB} \cdot N_{symb}^{sh} - N_{DMRS}^{PRB} - N_{oh}^{PRB}$, and the $N_{sc}^{RB}$ may correspond to a number of subcarriers included in one resource block, the $N_{symb}^{sh}$ may correspond to a number of orthogonal frequency division multiplexing (OFDM) symbols allocated to a physical downlink shared channel (PDSCH), the $N_{DMRS}^{PRB}$ may correspond to a number of resource elements included in one physical resource block (PRB), the $N_{oh}^{PRB}$ may correspond to a number of resource elements occupied by overhead in the one PRB, and $n_{PRB}$ may correspond to a number of PRBs allocated to the PDSCH in a slot.

The maximum value of the $N_{RE}$ may be determined based on a maximum value of the $n_{PRB}$.

In accordance with another aspect of the disclosure, a method performed by a base station in a wireless communication system is provided. The method includes receiving, from an UE, capability information of the UE, and transmitting configuration information associated with a TBS, and the TBS is determined based on a value of $N_{RE} \cdot R \cdot Q_m \cdot v$, wherein the $N_{RE}$ corresponds to a number of allocated resource elements, the R corresponds to a code rate, and the $Q_m$ corresponds to a modulation order, and the v corresponds to a number of allocated layers, wherein a maximum value of the TBS is considered for transport block over multiple slots (TBoMS), and wherein the maximum value of the TBS is determined by limiting at least one of a value of the $N_{RE}$, the R, the $Q_m$ or the v.

A maximum value of the $N_{RE}$ may be determined based on at least one of a frequency or a subcarrier spacing.

The $N_{RE}$ may correspond to min (156, $N_{RE}'$)·$n_{PRB}$, and the $N_{RE}'$ may correspond to $N_{sc}^{RB} \cdot N_{symb}^{sh} - N_{DMRS}^{PRB} - N_{oh}^{PRB}$, and the $N_{sc}^{RB}$ may correspond to a number of subcarriers included in one resource block, the $N_{symb}^{sh}$ may correspond to a number of orthogonal frequency division multiplexing (OFDM) symbols allocated to a physical downlink shared channel (PDSCH), the $n_{DMRS}^{PRB}$ may correspond to a number of resource elements included in one physical resource block (PRB), the $N_{oh}^{PRB}$ may correspond to a number of resource elements occupied by overhead in the one PRB, and $n_{PRB}$ may correspond to a number of PRBs allocated to the PDSCH in a slot.

The maximum value of the $N_{RE}$ may be determined based on a maximum value of the $n_{PRB}$.

In accordance with another aspect of the disclosure, a base station in a wireless communication system is provided. The base station includes a transceiver, and at least one processor coupled with the transceiver and configured to receive, from an UE, capability information of the UE, and transmit configuration information associated with a TBS, wherein the TBS is determined based on a value of $N_{RE} \cdot R \cdot Q_m \cdot v$, wherein the $N_{RE}$ corresponds to a number of allocated resource elements, the R corresponds to a code rate, and the $Q_m$ corresponds to a modulation order, and the v corresponds to a number of allocated layers, wherein a maximum value of the TBS is considered for transport block over multiple slots (TBoMS), and wherein the maximum value of the TBS is determined by limiting at least one of a value of the $N_{RE}$, the R, the $Q_m$, or the v.

A maximum value of the $N_{RE}$ may be determined based on at least one of a frequency or a subcarrier spacing.

The $N_{RE}$ may correspond to min (156, $N_{RE}'$)·$n_{PRB}$, and the $N_{RE}'$ may correspond to $N_{sc}^{RB} \cdot N_{symb}^{sh} - N_{DMRS}^{PRB} - N_{oh}^{PRB}$, and the $N_{sc}^{RB}$ may correspond to a number of subcarriers included in one resource block, the $N_{symb}^{sh}$ may correspond to a number of orthogonal frequency division multiplexing (OFDM) symbols allocated to a physical downlink shared channel (PDSCH), the $N_{DMRS}^{PRB}$ may correspond to a number of resource elements included in one physical resource block (PRB), the $N_{oh}^{PRB}$ may correspond to a number of resource elements occupied by overhead in the one PRB, and $n_{PRB}$ may correspond to a number of PRBs allocated to the PDSCH in a slot, wherein the maximum value of the $N_{RE}$ may be determined based on a maximum value of the $n_{PRB}$.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
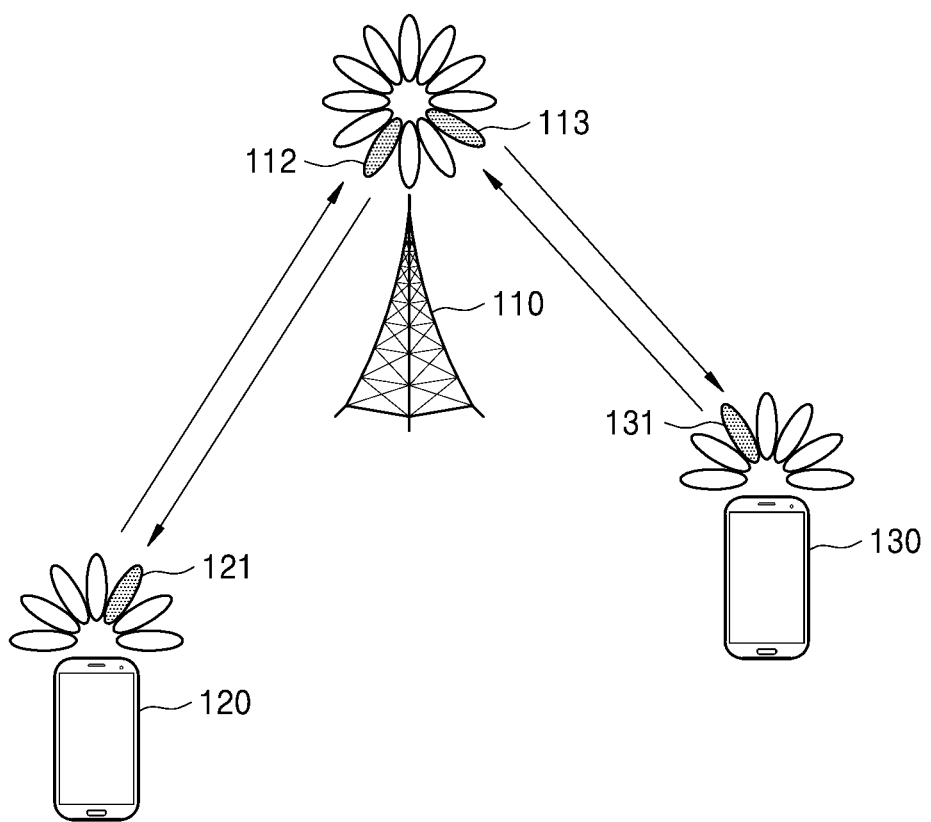
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Terms used herein are for describing particular embodiments and are not intended to limit the scope of other embodiments. The singular expression may also include the plural meaning as long as it is not inconsistent with the context. All the terms used herein, including technical and scientific terms, may have the same meanings as those generally understood by those of skill in the art. The terms as defined in a general dictionary may be interpreted as the same meanings as the contextual meanings of a related technology, and are not interpreted as ideal or excessively formal meanings unless defined clearly in the disclosure. In some cases, even the terms defined in the disclosure should not be interpreted to exclude the embodiments of the disclosure.

In various embodiments of the disclosure to be described below, a hardware approach will be described as an example. However, because the various embodiments of the disclosure include a technology using both hardware and software, the various embodiments of the disclosure do not exclude a software-based approach. In addition, although a wireless communication system is used as an example for describing various embodiments of the disclosure, the use of the embodiments of the disclosure in a wired communication system is not excluded.

The disclosure relates to an apparatus and method for transmitting and receiving data and control information in a wireless communication system. In detail, described herein is a technique for indicating, to a terminal, information about a band set assumed by a base station according to capability information of the terminal, and for using, by the terminal, configuration information from the base station to calculate transmission/reception parameters.

Hereinafter, terms indicating signals, terms indicating channels, terms indicating control information, terms indicating network entities, and terms indicating components of an apparatus are exemplary for convenience of descriptions. Accordingly, the disclosure is not limited to the terms used herein, and may use other terms having technically identical meaning. For example, in the disclosure, the terms 'peak data rate' and 'max data rate' may be interchangeably used.

In the following description, the terms 'physical channel' and 'signal' may be interchangeably used with the term 'data' or 'control signal'. For example, the term 'physical downlink shared channel (PDSCH)' indicates a physical channel on which data is transmitted, but the term 'PDSCH' may also be used to indicate data.

Throughout the specification, the term 'higher layer signaling' refers to a method of transferring a signal to a terminal from a base station by using a downlink data channel of a physical layer or to the base station from the terminal by using an uplink data channel of the physical layer. The term 'higher layer signaling' may be understood as radio resource control (RRC) signaling or a media access control (MAC) control element (CE).

In addition, although the expression 'more than' or 'less than' may be used herein in order to determine whether or not a specific condition is satisfied or fulfilled, this is only for describing an example and does not exclude the expression 'greater than or equal to' or 'less than or equal to'. The expression 'greater than or equal to' may be replaced with 'greater than', the expression 'less than or equal to' may be replaced with 'less than', and the expression 'greater than or equal to x and less than y' may be replaced with 'greater than x and less than or equal to y'.

In addition, although various embodiments of the disclosure will be described by using terms used in a certain communication standard (e.g., 3rd Generation Partnership Project (3GPP)), the terms are merely examples for explanation. Various embodiments of the disclosure may also be easily modified and applied to other communication systems.

FIG. 1 illustrates a wireless communication system according to an embodiment of the disclosure. FIG. 1 illustrates a base station 110, a terminal 120, and a terminal 130, as parts of nodes using a radio channel in the wireless communication system. Although FIG. 1 illustrates only one base station, the wireless communication system may further include other base stations identical or similar to the base station 110.

Referring to FIG. 1, the base station 110 is a network infrastructure that provides the terminals 120 and 130 with wireless access. The base station 110 has a coverage defined as a certain geographic area based on the distance over which signals can be transmitted. The base station 110 may be referred to as an access point (AP), an evolved NodeB (eNodeB, eNB), a 5th Generation (5G) node, a next-generation NodeB (gNB), a wireless point, a transmission/reception point (TRP), or other terms having equivalent technical meanings.

Each of the terminal 120 and the terminal 130 is used by a user and performs communication with the base station 110 on a radio channel A link from the base station 110 to the terminal 120 or the terminal 130 is referred to as a downlink (DL), and a link from the terminal 120 or the terminal 130 to the base station 110 is referred to as an uplink (UL). In some cases, at least one of the terminal 120 or the terminal 130 may be operated without user involvement. That is, at least one of the terminal 120 or the terminal 130 may be a device for performing machine-type communication (MTC), and may not be carried by a user. Each of the terminal 120 and the terminal 130 may be referred to as, in addition to 'terminal', 'user equipment (UE)', 'mobile station', 'subscriber station', 'remote terminal', 'wireless terminal', 'user device', or other terms having equivalent technical meanings.

The base station 110, the terminal 120, and the terminal 130 may transmit and receive radio signals in a millimeter-wave (mmWave) band (e.g., 28 GHz, 30 GHz, 38 GHz, or 60 GHz). In this case, in order to improve a channel gain, the base station 110, the terminal 120, and the terminal 130 may perform beamforming Here, beamforming may include transmission beamforming and reception beamforming That is, the base station 110, the terminal 120, and the terminal 130 may provide directivity to a transmission signal or a reception signal. To this end, the base station 110 and the terminals 120 and 130 may select serving beams 112, 113, 121, and 131 through a beam search or beam management procedure. After the serving beams 112, 113, 121, and 131 are selected, subsequent communication may be performed through resources that are quasi co-located (QCL) with resources that transmit the serving beams 112, 113, 121, and 131.

It may be evaluated that a first antenna port and a second antenna port have a QCL relationship when large-scale properties of a channel over which a symbol on the first antenna port is conveyed can be inferred from a channel over which a symbol on the second antenna port is conveyed. For example, the large-scale properties may include at least one of delay spread, Doppler spread, Doppler shift, average gain, average delay, or spatial receiver parameters.

Figure 2:
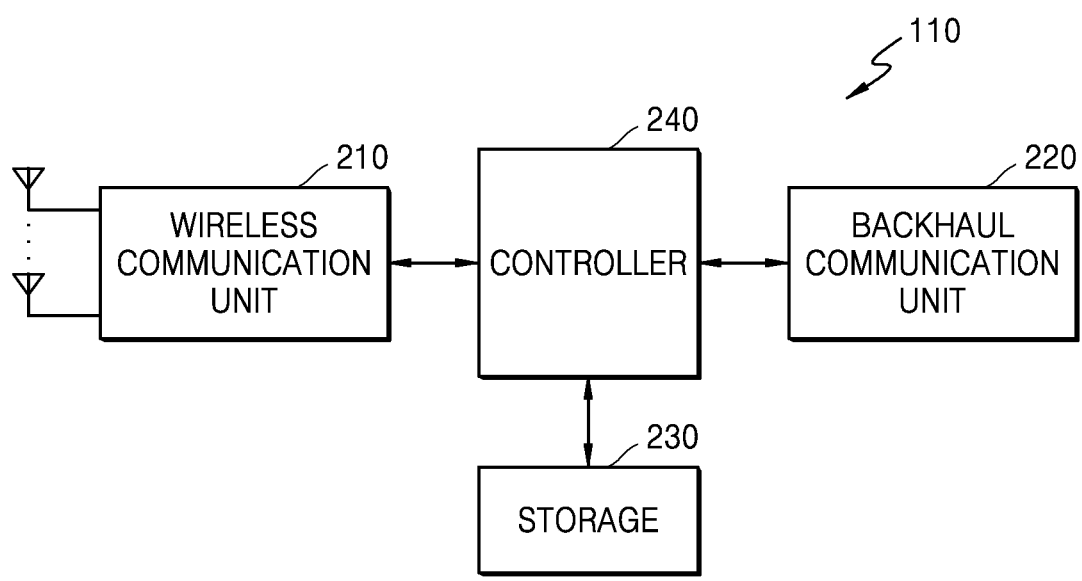
FIG. 2 illustrates a configuration of a base station in a wireless communication system, according to an embodiment of the disclosure.

FIG. 2 illustrates a configuration of the base station 110 in a wireless communication system, according to an embodiment of the disclosure. The configuration illustrated in FIG. 2 may be understood as a configuration of the base station 110. The terms such as " ... er (or)", " ... unit", etc., used herein denote a unit that performs at least one function or operation, which may be implemented as hardware or software or a combination thereof.

Referring to FIG. 2, the base station 110 includes a wireless communication unit 210, a backhaul communication unit 220, a storage 230, and a controller 240.

The wireless communication unit 210 performs functions for transmitting and receiving signals on a radio channel. For example, the wireless communication unit 210 performs a function of converting between a baseband signal and a bit string according to a physical layer standard of a system. For example, upon transmission of data, the wireless communication unit 210 encodes and modulates a transmission bit string to generate complex symbols. Also, upon reception of data, the wireless communication unit 210 reconstructs a reception bit string by demodulating and decoding a baseband signal.

The wireless communication unit 210 up-converts a baseband signal into a radio frequency (RF) band signal, transmits the RF band signal through an antenna, and down-converts an RF band signal received through an antenna into a baseband signal. To this end, the wireless communication unit 210 may include a transmission filter, a reception filter, an amplifier, a mixer, an oscillator, a digital-to-analog converter (DAC), an analog-to-digital converter (ADC), etc. In addition, the wireless communication unit 210 may include a plurality of transmission and reception paths. Furthermore, the wireless communication unit 210 may include at least one antenna array including a plurality of antenna elements.

In terms of hardware, the wireless communication unit 210 may include a digital unit and an analog unit, and the analog unit may include a plurality of sub-units according to operating power, an operating frequency, etc. The digital unit may be implemented as at least one processor (e.g., a digital signal processor (DSP)).

The wireless communication unit 210 transmits and receives a signal as described above. Accordingly, all or part of the wireless communication unit 210 may be referred to as 'transmitter', 'receiver', or 'transceiver'. Also, in the following description, transmission and reception performed by using a radio channel are used to mean that the above-described processing is performed by the wireless communication unit 210.

The backhaul communication unit 220 provides an interface for performing communication with other nodes in a network. That is, the backhaul communication unit 220 converts a bit string transmitted from a base station to another node, for example, another access node, another base station, a higher node, a core network, etc., into a physical signal, and converts a physical signal received from another node into a bit string.

The storage 230 stores data such as a basic program, an application program, and configuration information for operations of the base station 110. The storage 230 may include a volatile memory, a nonvolatile memory, or a combination of a volatile memory and a nonvolatile memory. In addition, the storage 230 may provide data stored therein at a request of the controller 240.

The controller 240 controls the overall operations of the base station 110. For example, the controller 240 transmits and receives a signal through the wireless communication unit 210 or the backhaul communication unit 220. Also, the controller 240 writes and reads data in and from the storage 230. In addition, the controller 240 may perform functions of a protocol stack required in a communication standard. In another implementation, the protocol stack may be included in the wireless communication unit 210. To this end, the controller 240 may include at least one processor. According to various embodiments of the disclosure, the controller 240 may control the base station 110 to perform operations according to various embodiments of the disclosure, which are described below.

Figure 3:
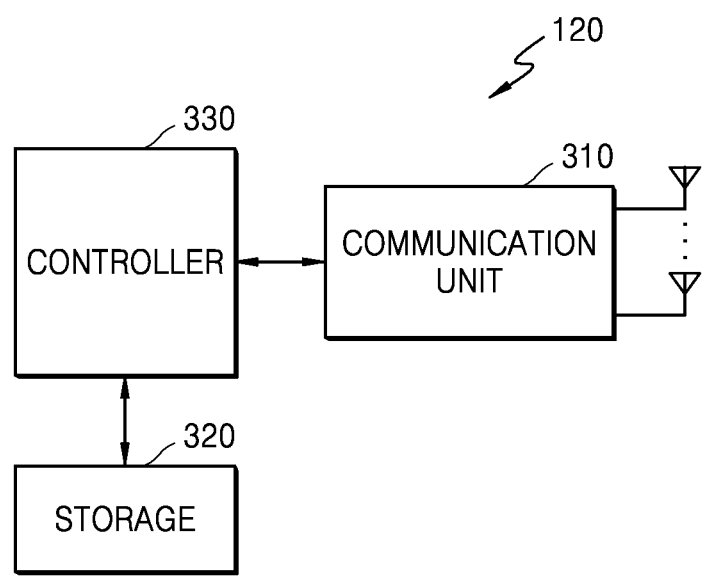
FIG. 3 illustrates a configuration of a terminal in a wireless communication system, according to an embodiment of the disclosure.

FIG. 3 illustrates a configuration of the terminal 120 in a wireless communication system, according to an embodiment of the disclosure. The configuration illustrated in FIG. 3 may be understood as a configuration of the terminal 120. The terms such as " ... er (or)", " ... unit", etc., used herein denote a unit that performs at least one function or operation, which may be implemented as hardware or software or a combination thereof.

Referring to FIG. 3, the terminal 120 includes a communication unit 310, a storage 320, and a controller 330.

The communication unit 310 performs functions for transmitting and receiving signals on a radio channel. For example, the communication unit 310 performs a function of converting between a baseband signal and a bit string according to a physical layer standard of a system. For example, upon transmission of data, the communication unit 310 encodes and modulates a transmission bit string to generate complex symbols. Also, upon reception of data, the communication unit 310 reconstructs a reception bit string by demodulating and decoding a baseband signal. In addition, the communication unit 310 up-converts a baseband signal into an RF band signal, transmits the RF band signal through an antenna, and down-converts an RF band signal received through an antenna into a baseband signal. For example, the communication unit 310 may include a transmission filter, a reception filter, an amplifier, a mixer, an oscillator, a DAC, an ADC, etc.

In addition, the communication unit 310 may include a plurality of transmission and reception paths. Furthermore, the communication unit 310 may include at least one antenna array including a plurality of antenna elements. In terms of hardware, the communication unit 310 may include a digital circuit and an analog circuit (e.g., a radio-frequency integrated circuit (RFIC)). Here, the digital circuit and the analog circuit may be implemented as one package. In addition, the communication unit 310 may include a plurality of RF chains. Furthermore, the communication unit 310 may perform beamforming.

The communication unit 310 transmits and receives a signal as described above. Accordingly, all or part of the communication unit 310 may be referred to as 'transmitter', 'receiver', or 'transceiver'. Also, in the following description, transmission and reception performed by using a radio channel are used to mean that the above-described processing is performed by the communication unit 310.

The storage 320 stores data such as a basic program, an application program, and configuration information for operations of the terminal 120. The storage 320 may include a volatile memory, a nonvolatile memory, or a combination of a volatile memory and a nonvolatile memory. In addition, the storage 320 may provide data stored therein at a request of the controller 330.

The controller 330 controls the overall operations of the terminal 120. For example, the controller 330 transmits and receives a signal through the communication unit 310. Also, the controller 330 writes and reads data in and from the storage 320. In addition, the controller 330 may perform functions of a protocol stack required in a communication standard. To this end, the controller 330 may include at least one processor or a microprocessor, or may be part of a processor. In addition, part of the communication unit 310 and the controller 330 may be referred to as a communication processor (CP). According to various embodiments of the disclosure, the controller 330 may control the terminal 120 to perform operations according to various embodiments of the disclosure, which are described below.

Figure 4:
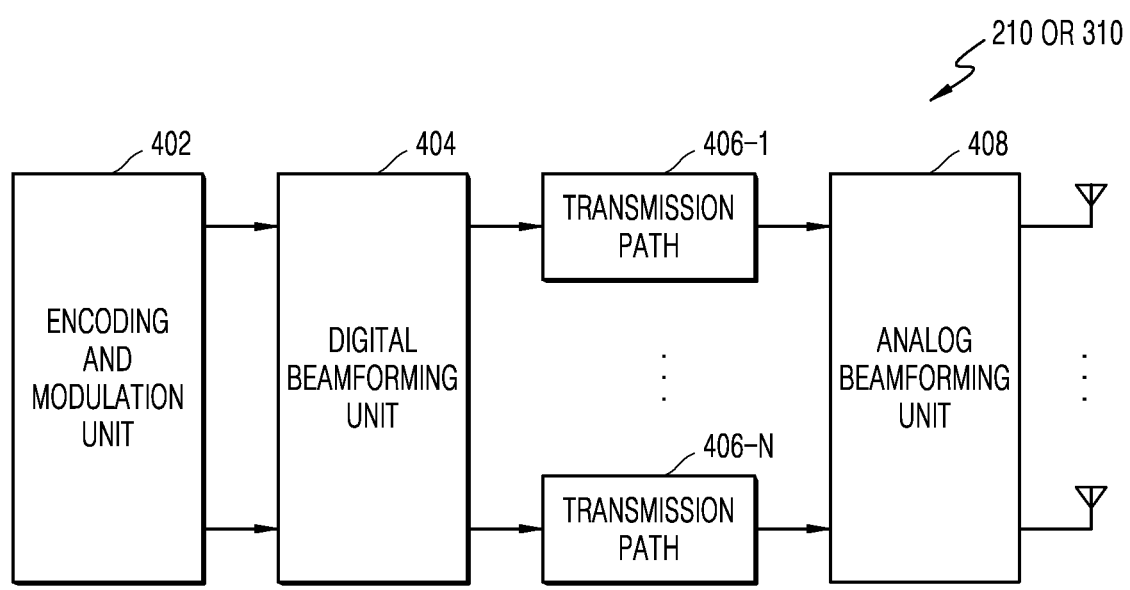
FIG. 4 illustrates a configuration of a communication unit in a wireless communication system, according to an embodiment of the disclosure.

FIG. 4 illustrates a configuration of the wireless communication unit 210 or the communication unit 310 in a wireless communication system, according to an embodiment of the disclosure. FIG. 4 illustrates an example of a detailed configuration of the wireless communication unit 210 of FIG. 2 or the communication unit 310 of FIG. 3. In detail, FIG. 4 illustrates components, which are parts of the wireless communication unit 210 of FIG. 2 or the communication unit 310 of FIG. 3, for performing beamforming.

Referring to FIG. 4, the wireless communication unit 210 or the communication unit 310 includes an encoding and modulation unit 402, a digital beamforming unit 404, a plurality of transmission paths 406-1 to 406-N, and an analog beamforming unit 408.

The encoding and modulation unit 402 performs channel encoding. For performing channel encoding, at least one of a low-density parity-check (LDPC) code, a convolutional code, or a polar code may be used. The encoding and modulation unit 402 generates modulation symbols by performing constellation mapping.

The digital beamforming unit 404 performs beamforming on a digital signal (e.g., modulation symbols). To this end, the digital beamforming unit 404 multiplies the modulation symbols by beamforming weights. Here, the beamforming weights are used to change the magnitude and phase of a signal, and may be referred to as a precoding matrix, a precoder, etc. The digital beamforming unit 404 outputs digitally beamformed modulation symbols to the plurality of transmission paths 406-1 to 406-N. At this point, according to a multiple-input multiple-output (MIMO) transmission scheme, the modulation symbols may be multiplexed, or the same modulation symbols may be provided to the plurality of transmission paths 406-1 to 406-N.

The plurality of transmission paths 406-1 to 406-N convert digitally beamformed digital signals into analog signals. To this end, each of the plurality of transmission paths 406-1 to 406-N may include an inverse fast Fourier transform (IFFT) operator, a cyclic prefix (CP) inserter, a DAC, and an up-converter. The CP inserter is for an orthogonal frequency-division multiplexing (OFDM) scheme and may be excluded when a different physical layer scheme (e.g., a filter bank multi-carrier (FBMC) scheme) is applied. That is, the plurality of transmission paths 406-1 to 406-N provide independent signal processing for a plurality of streams generated through digital beamforming. However, according to an implementation scheme, some of the components of the plurality of transmission paths 406-1 to 406-N may be shared.

The analog beamforming unit 408 performs beamforming on an analog signal. To this end, the analog beamforming unit 408 multiplies analog signals by beamforming weights. Here, the beamforming weights are used to change the magnitude and phase of a signal. In detail, the analog beamforming unit 440 may be configured in various ways according to a connection structure between the plurality of transmission paths 406-1 to 406-N and antennas. For example, each of the plurality of transmission paths 406-1 to 406-N may be connected to one antenna array. As another example, the plurality of transmission paths 406-1 to 406-N may be connected to one antenna array. As another example, the plurality of transmission paths 406-1 to 406-N may be adaptively connected to one, two, or more antenna arrays.

Wireless communication systems have evolved from systems providing voice-oriented services to broadband wireless communication systems providing high-speed, high-quality packet data services of communication standards such as High Speed Packet Access (HSPA) of 3GPP, Long-Term Evolution (LTE) or Evolved Universal Terrestrial Radio Access (E-UTRA), LTE Advanced (LTE-A), High Rate Packet Data (HRPD) of 3rd Generation Partnership Project 2 (3GPP2), Ultra Mobile Broadband (UMB), and Institute of Electrical and Electronics Engineers (IEEE) 802.16e. Also, as a 5G wireless communication system, the standards of 5G or New Radio (NR) are being created.

The NR system adopts an OFDM scheme in a DL and a UL. In detail, a CP-OFDM scheme is adopted in a DL, and a discrete Fourier transform OFDM (DFT-S-OFDM) scheme is adopted in a UL together with the CP-OFDM scheme. UL refers to a radio link through which a terminal transmits data or a control signal to a base station, and DL refers to a radio link through which a base station transmits data or a control signal to a terminal. In a multiple access scheme, in general, data or control information of each user may be distinguished by allocating and operating time-frequency resources, at which the data or control information of each user is transmitted, so as not to overlap each other, i.e., to establish orthogonality.

The NR system adopts a hybrid automatic repeat request (HARQ) scheme that, when a failure of decoding occurs in initial transmission, retransmits corresponding data in a physical layer. According to the HARQ scheme, when a receiver fails to correctly decode data, the receiver transmits, to a transmitter, a negative acknowledgement (NACK), which is information for informing the transmitter of the failure of decoding, so as to allow the transmitter to retransmit corresponding data in a physical layer. The receiver may improve data reception performance by combining the data retransmitted by the transmitter with the decoding-failed data. In addition, when the receiver correctly decodes the data, the receiver transmits, to the transmitter, an acknowledgement (ACK) for informing the transmitter of the success of decoding, so as to allow the transmitter to transmit new data.

Figure 5:
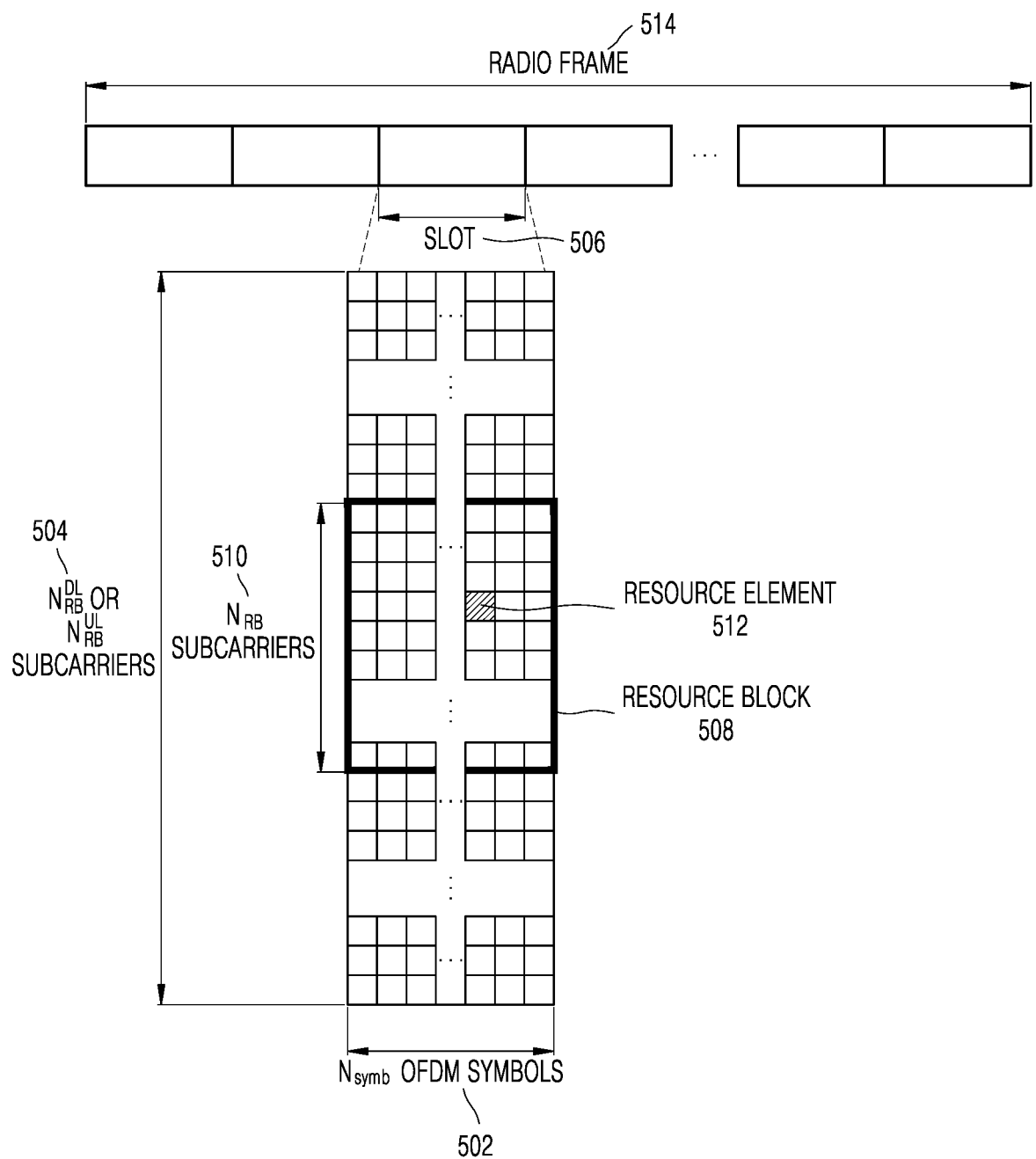
FIG. 5 illustrates a resource structure of a time-frequency domain in a wireless communication system, according to an embodiment of the disclosure.

FIG. 5 illustrates a resource structure of a time-frequency domain in a wireless communication system, according to an embodiment of the disclosure. FIG. 5 illustrates a basic structure of a time-frequency domain, which is a radio resource region in which data or a control channel is transmitted in a DL or a UL.

bandwidth of a system transmission band. The data rate increases in proportion to the number of RBs scheduled for a terminal. In the NR system, in a case of a frequency-division duplex (FDD) system that differentiates and operates a DL and a UL by frequency, the DL transmission bandwidth may differ from the UL transmission bandwidth. A channel bandwidth refers to an RF bandwidth corresponding to the system transmission bandwidth. Table 1 indicates some of relationships among a system transmission bandwidth, subcarrier spacing (SCS), and a channel bandwidth, defined in an NR system in a frequency band FR1 of 6 GHz or less, and Table 2 indicates some of corresponding relationships among a system transmission bandwidth, SCS, and a channel bandwidth, defined in an NR system in a frequency band FR2 of 6 GHz or greater. For example, in an NR system having a 100 MHz channel bandwidth with 30 kHz subcarrier spacing, a transmission bandwidth includes 273 RBs. In Table 1 and Table 2, 'N/A' refers to a combination of a bandwidth and a subcarrier, which is not supported in the NR system.

TABLE 1

| CHANNEL BANDWIDTH [MHz] | | 5 $N_{RB}$ | 10 $N_{RB}$ | 15 $N_{RB}$ | 20 $N_{RB}$ | 25 $N_{RB}$ | 30 $N_{RB}$ | 40 $N_{RB}$ | 50 $N_{RB}$ | 60 $N_{RB}$ | 70 $N_{RB}$ | 80 $N_{RB}$ | 90 $N_{RB}$ | 100 $N_{RB}$ |
|---|---|---|---|---|---|---|---|---|---|---|---|---|---|---|
| SCS [kHz] | 15 | 25 | 52 | 79 | 106 | 133 | 160 | 216 | 270 | N/A | N/A | N/A | N/A | N/A |
|  | 30 | 11 | 24 | 38 | 51 | 65 | 78 | 106 | 133 | 162 | 189 | 217 | 245 | 273 |
|  | 60 | N/A | 11 | 18 | 24 | 31 | 38 | 51 | 65 | 79 | 93 | 107 | 121 | 135 |

Referring to FIG. 5, the horizontal axis represents the time domain, and the vertical axis represents the frequency domain. The minimum transmission unit in the time domain is an OFDM symbol, and $N_{symb}$ OFDM symbols 502 constitute one slot 506. The length of a subframe may be defined to be 1.0 ms, and the length of a radio frame 514 may be defined to be 10 ms. The minimum transmission unit in the frequency domain is a subcarrier, and the bandwidth of the entire system transmission band is composed of a total of $N_{DL}^{RB}$ or $N_{UL}^{RB}$ subcarriers 504.

The basic resource unit in the time-frequency domain is a resource element (RE) 512, which may be represented by an OFDM symbol index and a subcarrier index. A resource block (RB) or physical resource block (PRB) 508 is defined by the $N_{symb}$ consecutive OFDM symbols 502 in the time domain and $N_{RE}$ consecutive subcarriers 510 in the frequency domain. Accordingly, one RB 508 includes ($N_{symb} \times N_{RE}$) Res 512. Generally, a minimum transmission unit of data is an RB. In the NR system, in general, $N_{symb}=14$, $N_{RE}=12$, and $N_{BW}$ and $N_{RE}$ may be proportional to the

TABLE 2

| CHANNEL BANDWIDTH [MHz] | | 50 $N_{RB}$ | 100 $N_{RB}$ | 200 $N_{RB}$ | 400 $N_{RB}$ |
|---|---|---|---|---|---|
| SCS [kHz] | 60 | 66 | 132 | 264 | N/A |
|  | 120 | 32 | 66 | 132 | 264 |

In the NR system, scheduling information regarding downlink data or uplink data is transmitted from a base station to a terminal via downlink control information (DCI). The DCI may be defined in various formats, and whether the DCI is an uplink grant that is scheduling information about uplink data or a downlink grant that is scheduling information about downlink data, whether the DCI is compact DCI, the control information of which has a small size, whether spatial multiplexing using a multiplexing antenna is applied, whether the DCI is for controlling power, and the like may be determined according to each format. For example, DCI format 1-1, which is scheduling control information about the downlink data, may include at least one of items shown in Table 3.

TABLE 3

| Item | Description |
|---|---|
| Carrier indicator | This indicates the frequency carrier on which data is transmitted. |
| DCI format indicator | This is an indicator for indicating whether the DCI is for a downlink or an uplink. |
| Bandwidth part (BWP) indicator | This indicates a BWP in which transmission is performed. |
| Frequency-domain resource allocation | This indicates an RB of a frequency domain, which is allocated for data transmission. A resource to be expressed is determined according to a system bandwidth and a resource allocation scheme. |

TABLE 3-continued

| Item | Description |
|---|---|
| Time-domain resource allocation | This indicates a slot and an OFDM symbol of the slot, in which a data-related channel is to be transmitted. |
| VRB-to-PRB mapping | This indicates a mapping scheme by which a virtual RB (VRB) index is mapped to a physical RB (PRB) index. |
| MCS(modulation and coding scheme) | This indicates a modulation scheme and a coding rate used for data transmission. That is, this may indicate information regarding whether the modulation scheme is QPSK, 16 QAM, 64 QAM, or 256 QAM, and may indicate a coding rate value indicating TBS and channel coding information. |
| Code-block group (CBG) transmission information | This indicates information on a CBG to be transmitted when CBG retransmission is configured. |
| HARQ process number | This indicates a process number of HARQ. |
| NDI(new data indicator) | This indicates whether HARQ transmission is initial transmission or retransmission. |
| RV(redundancy version) | This indicates the redundancy version of HARQ. |
| Transmit power control (TPC) command for physical uplink control channel (PUCCH) | This indicates a TPC command for the PUCCH serving as an uplink control channel. |

In Table 3, in a case of PDSCH transmission, the time-domain resource assignment may be expressed by information about a slot in which a PUSCH is transmitted, a start symbol position S in the corresponding slot, and the number L of symbols to which the PDSCH is mapped. Here, S may indicate a relative position from the start of the slot, L may indicate the number of consecutive symbols, and S and L may be determined by a start and length indicator value (SLIV) defined as shown in Table 4.

TABLE 4 if (L−1)≤7 then
   SLIV=14 · (L−1)+S
else
   SLIV=14 · (14−L+11)+(14−1−S)
where 0<L≤14−S In the NR system, in general, information about a corresponding relationship among a SLIV, a PDSCH or physical uplink shared channel (PUSCH) mapping type, and information about a slot in which the PDSCH or PUSCH is transmitted may be configured in one row via an RRC configuration. Thereafter, the base station may transmit the SLIV, the PDSCH or PUSCH mapping type, and the information about the slot in which the PDSCH or PUSCH is transmitted, to the terminal by indicating an index value defined in the configured corresponding relationship, by using the time-domain resource assignment of the DCI.

In the NR system, a PDSCH or PUSCH mapping type is defined as type A and type B. In a case of PDSCH or PUSCH mapping type A, a demodulation reference signal (DMRS) symbol starts from a second or third OFDM symbol in a slot. In a case of PDSCH or PUSCH mapping type B, the DMRS symbol starts from a first OFDM symbol in a time-domain resource allocated via PUSCH transmission.

Table 5 and Table 6 show combinations of S and L supported for each PDSCH and PUSCH mapping type.

TABLE 5

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S = 3 is applicable only if dmrs-TypeA-Posiition = 3

TABLE 6

| PUSCH mapping type | Normal cyclic prefix | | | Extended cyclic prefix | | |
|---|---|---|---|---|---|---|
| | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 12} | {1, . . . , 12} | {1, . . . , 12} |

The DCI may be channel-coded and modulated and then transmitted via a physical downlink control channel (PDCCH), which is a downlink control channel. The term 'PDCCH' may also be used to refer to control information, not a channel. In general, the DCI is scrambled with a certain radio network temporary identifier (RNTI) or a terminal identifier independently for each terminal, is appended with a cyclic redundancy check (CRC), is channel-coded, is then configured as an independent PDCCH, and is transmitted. The PDCCH is mapped to a control resource set (CORE-SET) configured to the terminal.

The DL data may be transmitted via a PDSCH, which is a physical channel for DL data transmission. The PDSCH may be transmitted after a control channel transmission interval, and scheduling information, such as a detailed mapping position in a frequency domain or a modulation scheme, is indicated by the DCI transmitted via the PDCCH. By using a modulation and coding scheme (MCS) in the control information constituting the DCI, the base station notifies the terminal of a modulation scheme applied to the PDSCH to be transmitted to the terminal and the size of data to be transmitted (e.g., a transport block size (TBS)). In an embodiment of the disclosure, the MCS may be composed of 5 bits or may be composed of more or less than 5 bits. The TBS corresponds to a size before channel coding for error correction is applied to a transport block (TB), which is data to be transmitted by the base station.

In the disclosure, a TB may include a MAC header, a MAC CE, one or more MAC service data units (SDUs), and padding bits. Alternatively, the TB may indicate a data unit or a MAC protocol data unit (PDU) transmitted from a MAC layer to a physical layer.

The modulation scheme for a DL supported in the NR system is quadrature phase-shift keying (QPSK), 16 quadrature amplitude modulation (QAM), 64 QAM, 256 QAM or 1024 QAM, and the modulation scheme for a UL is (7) BPSK, QPSK, 16 QAM or 64 QAM, but a modulation scheme with a greater order may also be applied. The modulation order $Q_m$ of each modulation scheme may be expressed as 1, 2, 4, 6, 8 or 10. That is, 2 bits per symbol may be transmitted for QPSK, 4 bits per symbol may be transmitted for 16 QAM, 6 bits per symbol may be transmitted for 64 QAM, 8 bits per symbol may be transmitted for 256 QAM, and 10 bits per symbol may be transmitted for 1024 QAM.

Figure 6A:
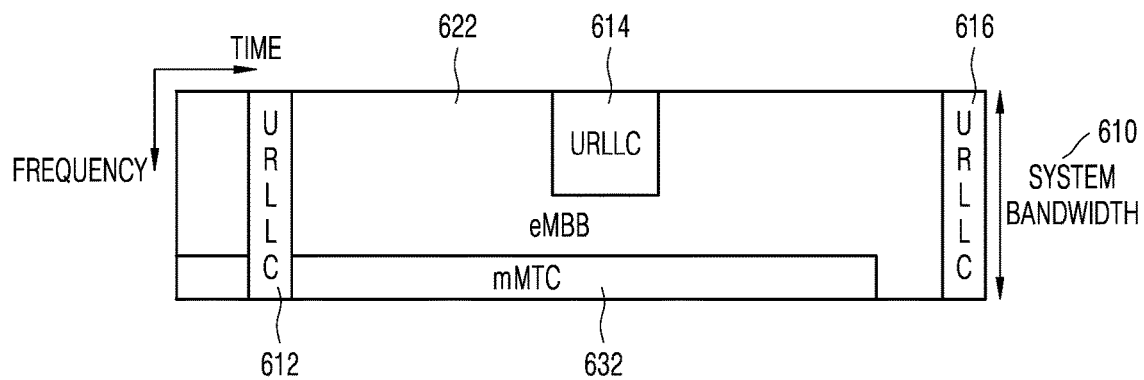
FIG. 6A illustrates an example of allocating data for each service to frequency-time resources in a wireless communication system, according to an embodiment of the disclosure.
Figure 6B:
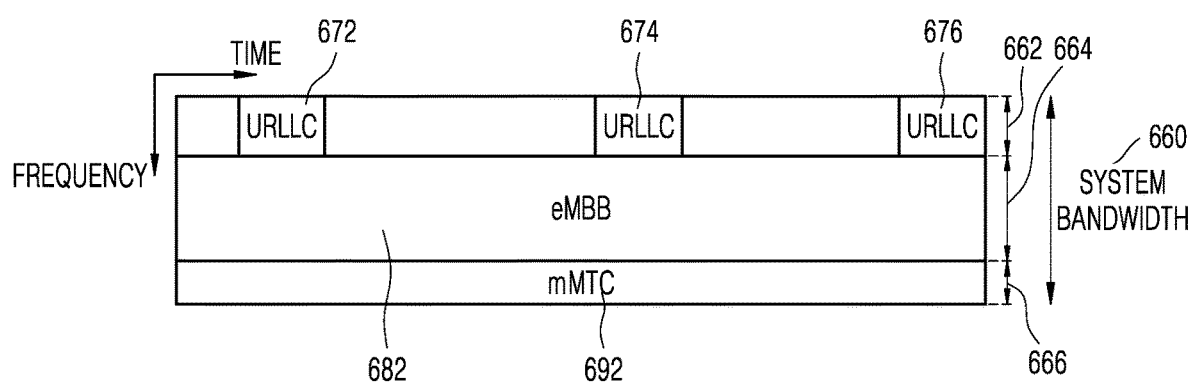
FIG. 6B illustrates another example of allocating data for each service to frequency-time resources in a wireless communication system, according to an embodiment of the disclosure.

In terms of a service, the NR system is designed to enable various services to be freely multiplexed in time and frequency resources, and accordingly, waveform/numerology, a reference signal, and the like may be dynamically or freely adjusted as necessary. In order to provide an optimal service to a terminal in wireless communication, data transmission optimized through measurement of the quality and interference of a channel is important, and thus accurate channel state measurement is mandatory. However, unlike $4^{th}$ Generation (4G) communication in which channel and interference characteristics do not largely change depending on frequency resources, the channel and interference characteristics of a 5G channel significantly largely change depending on a service, and thus a subset of a frequency resource group (FRG) needs to be supported to divide and measure the channel and interference characteristics. In the NR system, types of supported services may be divided into enhanced mobile broadband (eMBB), massive machine type communications (mMTC), and ultra-reliable and low-latency communications (URLLC). eMBB is a service aiming at high-speed transmission of a large amount of data, mMTC is a service aiming at terminal power minimization and multiple terminal connections, and URLLC is a service aiming at high reliability and low delay. Different requirements may be applied depending on types of services applied to the terminal. FIGS. 6A and 6B illustrates examples of resource allocation of services. Hereinafter, a scheme in which frequency and time resources are allocated for information transmission in each system is identified with reference to FIGS. 6A and 6B.

FIG. 6A illustrates an example of allocating data for each service to frequency-time resources in a wireless communication system, according to an embodiment of the disclosure.

Referring to FIG. 6A, resources are allocated for eMBB 622, URLLC 612, 614, and 616, and mMTC 632 in an entire system bandwidth 610. When data of the URLLC 612, 614, and 616 is generated while data of the eMBB 622 and data of the mMTC 632 are allocated to certain frequency bands and transmitted, the data of the URLLC 612, 614, and 616 may be transmitted without emptying portions already allocated for the eMBB 622 and the mMTC 632 or without transmitting the data of the eMBB 622 and the mMTC 632. Because URLLC requires reduction of latency, resources for transmitting the data of the URLLC 612, 614, and 616 may be allocated to overlap a portion of resources allocated to the eMBB 622. Naturally, when the URLLC 612, 614, and 616 is additionally allocated and transmitted by using the resources to which the eMBB 622 is allocated, the data of the eMBB 622 may not be transmitted in the overlapping frequency-time resources, and thus the performance of transmission of the data of the eMBB 622 may be low. That is, in this case, transmission of the data of the eMBB 622 may fail due to the allocation of resources for the URLLCs 612, 614, and 616. Such a method as illustrated in FIG. 6A may be referred to as preemption.

Referring to FIG. 6B, illustrates another example of allocating data for each service to frequency-time resources in a wireless communication system, according to various embodiments of the disclosure. FIG. 6B illustrates an example in which services are provided in respective sub-bands 662, 664, and 666 into which an entire system bandwidth 660 is divided. In detail, the sub-band 662 is used for data transmission of URLLC 672, 674, and 676, the sub-band 664 is used for data transmission of eMBB 682, and the sub-band 666 is used for data transmission of the mMTC 692. Information related to the configuration of the sub-bands 662, 664, and 666 may be determined in advance, and may be transmitted from a base station to a terminal through higher layer signaling. Alternatively, a base station or a network node may arbitrarily divide information related to the sub-bands 662, 664, and 666, and provide a terminal with services without transmitting separate sub-band configuration information.

According to various embodiments of the disclosure, the length of a transmission time interval (TTI) used for URLLC transmission may be less than the length of a TTI used for eMBB or mMTC transmission. In addition, a response to information related to URLLC may be transmitted faster than a response to information related to eMBB or mMTC, and accordingly, a terminal using a URLLC service may transmit and receive information with low latency. Physical layer channels used for transmitting the aforementioned three types of services or data may have different structures. For example, the physical layer channels may differ in at least one of the length of a TTI, a frequency resource allocation unit, the structure of a control channel, or a method of mapping data.

Although three types of services and three types of data are described above, more types of services and more types of data corresponding thereto may be provided. In this case, various embodiments of the disclosure to be described below may be implemented.

Figure 7:
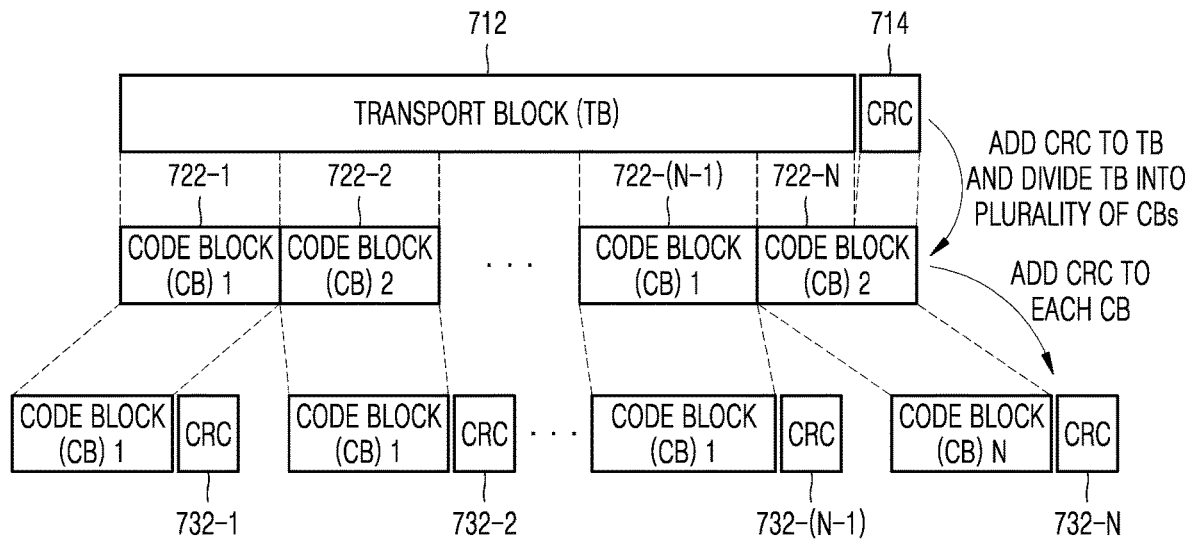
FIG. 7 illustrates a method of encoding data in a wireless communication system, according to an embodiment of the disclosure.

FIG. 7 illustrates a method of encoding data in a wireless communication system, according to an embodiment of the disclosure. FIG. 7 illustrates an example in which one TB 712 is segmented into several code blocks (CBs) 722-1, 722-2, 722-(N−1), and 722-N, and CRCs 732-1, 732-2, 732-(N−1), and 732-N are appended.

Referring to FIG. 7, a CRC 714 may be appended to the rear or front of the TB 712 to be transmitted in a UL or a DL. The CRC 714 may have 16 bits, 24 bits, or a previously fixed number of bits, or may have a variable number of bits depending on a channel state, etc., and may be used to determine whether channel coding is successful in a receiver. The TB 712 and a block to which the CRC 714 is appended are segmented into the plurality of CBs 722-1, 722-2, 722-(N−1), and 722-N. The size of CBs may be preset. The CRCs 732-1, 732-2, 732-(N−1), and 732-N may be appended to the segmented CBs, respectively. The CRCs 732-1, 732-2, 732-(N−1), 732-N may have 16 bits, 24 bits, or a previously fixed number of bits, and may be used to determine whether channel coding is successful in a receiver.

The TB 712 and a cyclic generator polynomial may be used to generate the CRC 714. The cyclic generator polynomial may be defined in various ways. For example, when a cyclic generator polynomial for a 24-bit CRC is $g_{CRC24A}(D)=D^{24}+D^{23}+D^{18}+D^{17}+D^{14}+D^{11}+D^{10}+D^{7}+D^{6}+D^{5}+D^{4}+D^{3}+D+1$, and L=24, CRC $p_1, p_2, \ldots, p_{L-1}$ may be determined to be a value obtained by dividing $a_0 D^{A+23}+a_1 D^{A+22}+\ldots+a_{A-1}D^{24}+p_0 D^{23}+p_1 D^{22}+\ldots+p_{22}D^1+p_{23}$ by $g_{CRC24A}(D)$ with a remainder of 0 with respect to TB data $a_0, a_1, a_2, a_3, \ldots, a_{A-1}$. In the above example, although the CRC length L is described to be 24, the length L may be defined differently, such as 12, 16, 24, 32, 40, 48, 64, etc.

As illustrated in FIG. 7, the maximum size of one CB is determined according to the type of channel coding to be applied, and the TB and the CRC appended to the TB are segmented into CBs according to the maximum size of the CB. In an LTE system, a CRC for a CB is appended to a segmented CB, a data bit and the CRC of the CB are encoded with a channel code to determine coded bits, and, for each of the coded bits, the number of bits to be rate-matched is determined as agreed upon in advance.

In 5G NR, a TB may be used as a CB without segmentation, or may be segmented into a plurality of CBs through an appropriate segmentation process according to a TBS to perform LDPC encoding for each CB. Here, a code block size (CBS) is determined as follows:

CBS Determination Method 1

The input bit sequence for code block segmentation is expressed as $b_0, b_1, \ldots, b_{B-1}$ (here, B>0). (This usually refers to a bit sequence with respect to a block including a TB and a CRC appended thereto, and, in a system where no CRC is appended to a TB, this may refer to a bit sequence with respect to only the TB.) When B is greater than the maximum CBS $K_{cb}$, segmentation of the input bit sequence is performed, and a CRC of L=24 bits is additionally appended to each CB. The maximum CBS for LDPC base graph 1 is $K_{cb}$=8448, and the maximum CBS for LDPC base graph 2 is $K_{cb}$=3840. (In general, the maximum CBS corresponds to the maximum number of information bits that a certain LDPC code is capable of performing encoding/decoding at a time.)

Operation 1: Determine the number C of CBs.
If B≤$K_{cb}$, L=0, C=1, and B'=B.
Otherwise, L=24, C=$\lceil B/(K_{cb}-L) \rceil$, and B'=B+C·L.

Operation 2: Bit outputs through CB segmentation are $c_{r0}, c_{r1}, \ldots, c_{r(Kr-1)}$, where r denotes a CB number (here, 0≤r<C), and Kr (=K) denotes the number of bits of the CB of the CB number r. Here, the number K of bits included in each CB is calculated as follows:

K'=B'/C;

In a case of LDPC base graph 1, $K_b$=22.
In a case of LDPC base graph 2,
If B>640, $K_b$=10;
if 560<B≤640, $K_b$=9;
If 192<B≤560, $K_b$=8; and
If B≤192, $K_b$=6.

Operation 3: Among the Z values in Table 7, determine a minimum value $Z_c$ satisfying $K_b \cdot Z \geq K'$. K=22$Z_c$ for LDPC base graph 1, and K=10$Z_c$ for LDPC base graph 2.

TABLE 7

| Set index ($i_{LS}$) | Set of lifting sizes (Z) |
|---|---|
| 0 | {2, 4, 8, 16, 32, 64, 128, 256} |
| 1 | {3, 6, 12, 24, 48, 96, 192, 384} |
| 2 | {5, 10, 20, 40, 80, 160, 320} |
| 3 | {7, 14, 28, 56, 112, 224} |
| 4 | {9, 18, 36, 72, 144, 288} |
| 5 | {11, 22, 44, 88, 176, 352} |
| 6 | {13, 26, 52, 104, 208} |
| 7 | {15, 30, 60, 120, 240} |

In operation 2 of CBS Determination Method 1, the $K_b$ values correspond to respective columns or column blocks corresponding to LDPC information bits in a base graph (or a base matrix) or a parity-check matrix of the LDPC code, and correspond to the maximum values (=$K_b Z_c$) of the LDPC information bits, which are not shortened or zero-padded. In other words, for example, even when the number of column blocks (or columns) corresponding to information bits in a parity-check matrix (or a base graph) of LDPC base graph 2 is 10, in a case where $K_b$=6, LDPC encoding is substantially performed on maximum 6$Z_c$ information bits at a time, and information bits corresponding to at least (10−$K_b$)$Z_c$=4$Z_c$ columns in the parity-check matrix are shortened or zero-padded. Here, the shortening or zero-padding may denote that a transmitter and a receiver may allocate an agreed bit value, such as 0, and may not use the corresponding elements in the parity-check matrix.

Table 7 shows candidates for a lifting size for LDPC encoding and decoding, and lifting refers to a technique used for designing or converting a quasi-cyclic (QC) LDPC code. In particular, the lifting refers to a method of supporting LDPC codes having various lengths by applying an operation (e.g., a modulo or flooring operation) corresponding to a lifting size to a given sequence corresponding to a parity-check matrix of an LDPC code to convert the sequence. In general, one number included in the sequence of the LDPC code may be a value corresponding to a circulant permutation matrix (also referred to as a circular permutation matrix). The lifting size may be a value corresponding to the size of circulant permutation matrices constituting the parity-check matrix.

For a parity-check matrix used in a communication and broadcasting system, a quasi-cyclic LDPC code (or a QC-LDPC code, hereinafter, referred to as the QC-LDPC code), which generally uses a QC parity-check matrix, is frequently used for easy implementation. The QC-LDPC code features a parity-check matrix including a 0-matrix (zero matrix) having a small square configuration or circulant permutation matrices. Here, the permutation matrix refers to a matrix in which each row or column has only one 1 and all remaining elements are 0s. In addition, the circulant permutation matrix refers to a matrix in which each element of an identity matrix is circularly rotated to the right.

Hereinafter, the QC-LDPC code is described in detail.

First, a Z×Z circulant permutation matrix $P=(P_{i,j})$ is defined by Equation 1. Here, $P_{i,j}$ represents an entry in the i-th row and the j-th column of the matrix P ($0 \le i,j < Z$).

$$P_{i,j} = \begin{cases} 1 & \text{if } i+1 \equiv j \bmod L \\ 0 & \text{otherwise} \end{cases}$$

Equation 1

For the permutation matrix P as defined above, $P^i$ ($0 \le i < Z$) is a circulant permutation matrix obtained by cyclically shifting the elements of a Z×Z identity matrix to the right by i positions.

The simplest parity-check matrix H of a QC-LDPC code may be represented as Equation 2.

$$H = \begin{bmatrix} P^{a_{11}} & P^{a_{12}} & \cdots & P^{a_{1n}} \\ P^{a_{21}} & P^{a_{22}} & \cdots & P^{a_{2n}} \\ \vdots & \vdots & \ddots & \vdots \\ P^{a_{m1}} & P^{a_{m2}} & \cdots & P^{a_{mn}} \end{bmatrix}$$

Equation 2

When $P^{-1}$ is a Z×Z zero matrix, the exponent aid of each circulant permutation matrix or zero matrix in Equation 3 has one of the values of $\{-1, 0, 1, 2, \ldots, Z-1\}$. The parity-check matrix H of Equation 2 has and n column blocks and m row blocks, and thus its size is mZ×nZ.

When the parity-check matrix of Equation 2 has full rank, the size of the information bits of the QC-LDPC code corresponding to the parity-check matrix is obviously (n–m)Z. For convenience of descriptions, (n–m) column blocks corresponding to information bits are referred to as information word column blocks, and m column blocks corresponding to the remaining parity bits are referred to as parity column blocks. When the parity-check matrix of Equation 2 does not have full rank, the size of the information bits is greater than (n–m)Z.

In general, an m×n binary matrix, which is obtained by replacing each circulant permutation matrix and zero matrix with 1 and 0, respectively, in the parity-check matrix of Equation 2, is referred to as a mother matrix, a base matrix, or a base graph M(H) of the parity-check matrix H, and an m×n integer matrix obtained as shown in Equation 3 by selecting exponents of each circulant permutation matrix or zero matrix is referred to as an exponent matrix E(H) of the parity-check matrix H.

$$E(H) = \begin{bmatrix} a_{11} & a_{12} & \cdots & a_{1n} \\ a_{21} & a_{22} & \cdots & a_{2n} \\ \vdots & \vdots & \ddots & \vdots \\ a_{m1} & a_{m2} & \cdots & a_{mn} \end{bmatrix}$$

Equation 3

As a result, one integer included in the exponent matrix corresponds to the circulant permutation matrix in the parity-check matrix, and thus the exponent matrix may be expressed as sequences of integers, for convenience. In general, a parity-check matrix refers to a binary matrix used to perform a parity check to detect an error of a codeword, and an exponent matrix consisting of integers as shown in Equation 3 corresponds to a parity-check matrix in a one-to-one manner when the lifting size and the lifting scheme are known, and thus the exponent matrix may also be referred to as the parity-check matrix, for convenience.

In general, the parity-check matrix may be expressed as not only the exponent matrix but also as various sequences that can express the algebraically equivalent characteristics. In the disclosure, for convenience, a parity-check matrix is expressed as a sequence indicating the positions of is in an exponent matrix, the parity-check matrix, or the like, however, there are various sequence notation systems capable of indicating the positions of 1s or 0s included in a parity-check matrix, and thus a parity-check matrix may be expressed as various sequences having an algebraically equivalent effect without being limited to the method used herein. The sequence may be referred to as various terms, for example, as an LDPC sequence, an LDPC code sequence, an LDPC matrix sequence, a parity-check matrix sequence, or the like, in order to be distinguished from other sequences.

In addition, although a transmission/reception apparatus on a device may perform LDPC encoding and decoding by directly generating a parity-check matrix, it may also perform the LDPC encoding and decoding by using an exponent matrix or a sequence having an algebraically equivalent effect to that of the parity-check matrix according to implementation characteristics. Accordingly, although encoding and decoding using a parity-check matrix are described in the disclosure for convenience, encoding and decoding may be implemented on an actual device through various methods capable of obtaining the same effect as that of the parity-check matrix.

For reference, the term 'algebraically equivalent effect' denotes that it is possible to explain or convert two or more different expressions such that they are logically or mathematically perfectly identical to each other. Examples of expression methods having an algebraically equivalent effect include expressing a parity-check matrix as an exponent matrix, applying a linear transformation to the exponent matrix, and changing the order of columns and rows of the parity-check matrix, and matrices obtained therefrom may be regarded as being substantially equivalent to the parity-check matrix. (In an LDPC code, the distribution of weight–1 in the parity-check matrix affects the performance, and simple rearrangements of columns and rows do not change algebraic characteristics such as the minimum distance or cycle characteristics.) As a detailed example, according to Equation 1, performing an operation of adding or subtracting a certain number to or from the elements of each column or row of the exponent matrix one or more times is equivalent to simply changing the order of columns and rows of the parity-check matrix, and thus the resultant matrix is substantially equivalent to the parity-check matrix.

Although an example in which only one circulant permutation matrix corresponds to one block is described herein for convenience, the embodiments of the disclosure may also be applied to a case in which several circulant permutation matrices are included in one block. For example, when the sum of two circulant permutation matrices $P^{a_{ij}^{(1)}}$, $P^{a_{ij}^{(2)}}$ is included in the position of an i-th row block and a j-th column block as shown in Equation 4, an exponent matrix thereof may be expressed as Equation 5. Equation 5 shows a matrix in which two integers correspond to an i-th row and a j-th column corresponding to the row block and the column block including the sum of the plurality of circulant permutation matrices.

$$H = \begin{bmatrix} \ddots & \square & \square & \cdot^{\cdot} \\ \square & P^{a_{ij}^{(1)}} + P^{a_{ij}^{(2)}} & \square & \square \\ \square & & \square & \square \\ \cdot^{\cdot} & \square & \square & \ddots \end{bmatrix},$$ Equation 4

$$E(H) = \begin{bmatrix} \ddots & \square & \square & \cdot^{\cdot} \\ \square & (a_{ij}^{(1)}, a_{ij}^{(2)}) & \square & \square \\ \square & & \square & \square \\ \cdot^{\cdot} & \square & \square & \ddots \end{bmatrix}.$$ Equation 5

Although a plurality of circulant permutation matrices may generally correspond to one row block and column block in the parity check matrix of a QC-LDPC code as described above, an example is described herein for convenience in which one circulant permutation matrix corresponds to one block, but the disclosure is not limited thereto. As described above, a Z×Z matrix in which a plurality of circulant permutation matrices are duplicated in one row block and column block is referred to as a circulant matrix or a circulant.

Because the performance of an LDPC code depends on the parity-check matrix, it is required to design a parity-check matrix that allows the LDPC code to have excellent performance. In addition, an LDPC encoding or decoding method capable of supporting various input lengths and code rates is required.

As described above, lifting refers to a method used not only to efficiently design a QC-LDPC code, but also to generate a parity-check matrix having various lengths or an LDPC codeword from a given exponent matrix. That is, lifting refers to a method applied to efficiently design a significantly large parity-check matrix by configuring a Z value that determines the size of a circulant permutation matrix or zero-matrix from a given small mother matrix according to a particular rule, or to generate a parity-check matrix having various lengths or to generate an LDPC codeword by applying an appropriate Z value to a given exponent matrix or a sequence corresponding thereto.

In operation 3 of CBS Determination Method 1, a process of selecting a minimum value satisfying a given condition from among lifting size Z values based on Table 7, and determining the value of $Z_c$ is required. In addition, because the set index to which the determined lifting size belongs indicates the parity-check matrix of the LDPC code for applying LDPC encoding to a code block, a terminal or a base station performs LDPC encoding or decoding based on the parity-check matrix of the LDPC code corresponding to the set index to which the determined lifting size belongs. Accordingly, in order to perform CBS Determination Method 1, the terminal or the base station needs to store the lifting size table of Table 7.

An embodiment of the disclosure proposes a method of efficiently determining the lifting size Z in a process of determining a CBS, by determining an accurate value through simple calculation without using Table 7. In a communication system according to various embodiments of the disclosure, a CBS may be calculated through the following operations:

CBS Determination Method 2

Operations 1 and 2: Same as operations 1 and 2 of CBS Determination Method 1, respectively Operation 3:

Operation 3-1:

$$Z_{temp} = \left\lceil \frac{K'}{K_b} \right\rceil$$

Operation 3-2: $n = \lfloor \log_2(Z_{temp} - 1) \rfloor - 3$

Operation 3-3:

$$i_{LS\_temp} = \left\lceil \frac{Z_{temp}}{2^n} \right\rceil$$

Operation 3-4: $Z_c = 2^n \cdot i_{LS\_temp}$ $K = 22Z_c$ for LDPC base graph 1, and $K = 10Z_c$ for LDPC base graph 2.

TABLE 8

| Set index ($i_{LS}$) | $i_{LS\_temp}$ |
| --- | --- |
| 0 | 16 |
| 1 | 12 |
| 2 | 10 |
| 3 | 14 |
| 4 | 9 |
| 5 | 11 |
| 6 | 13 |
| 7 | 15 |

In CBS Determination Method 2, when K' and $K_b$ are determined, a $Z_c$ value may be directly calculated or determined according to a predefined calculation rule, without lifting size candidates as shown in Table 7. In addition, by using $$i_{LS\_temp} = \left\lceil \frac{Z_{temp}}{2^n} \right\rceil$$

calculated in the process of determining the $Z_c$ value, a terminal or a base station may simply determine a parity-check matrix of an LDPC code to be used for LDPC encoding or decoding by using Table 8.

In summary, once K' and $K_b$ are determined, a temporary lifting size $Z_{temp}$ is determined based on the determined values. Thereafter, an integer value n may be determined according to a predefined rule based on the temporary lifting size ($n = \lfloor \log_2(Z_{temp} - 1) \rfloor - 3$), and an integer value $i_{LS\_temp}$ corresponding to an indicator of the parity-check matrix of the LDPC code may be determined based on the determined integer value n and the temporary lifting size $$Z_{temp}\left(i_{LS\_temp} = \left\lceil \frac{Z_{temp}}{2^n} \right\rceil\right).$$

Finally, a final lifting size $Z_c$ value is determined based on the determined integer value and the integer value $i_{LS\_temp}$ corresponding to the indicator of the parity-check matrix of the LDPC code ($Z_c = 2^n \cdot i_{LS\_temp}$).

Operation 3 of CBS Determination Method 2 is only an embodiment of the disclosure and may be modified in various forms. For example, the integer value n was limited to positive integers through a max(.) operation as in the following Modification 1 of operation 3 of CBS Determination Method 2. In this case, the $i_{LS\_temp}$ value may also be changed, and an index table corresponding to an LDPC parity-check matrix may also be changed as shown in Table 16.

In CBS Determination Method 1, the Zc value is finally determined by using Table 7 including candidate values for the lifting size Z, and the LDPC parity-check matrix may be determined according to the determined Zc value. However, when the communication system applies a method of determining the Zc value based on CBS Determination Method 1, the set of lifting size candidates as shown in Table 7 may be modified in different forms according to the communication system. For example, when the TBS increases like 24, 32, 40, 48, 56, 64, 72, 80, 88, 96, 104, . . . , and $K_b$=6 (fixed), the corresponding Z value sequentially increases like 7, 8, 10, 11, 12, 14, 15, 16, 17, 18, 20, . . . . Therefore, in this case, a lifting size candidate set as shown in Table 9 may be used.

TABLE 9

| Set index ($i_{LS}$) | Set of lifting sizes (Z) |
| --- | --- |
| 0 | {8, 16, 32, 64, 128, 256} |
| 1 | (12, 24, 48, 96, 192, 384) |
| 2 | {10, 20, 40, 80, 160, 320} |
| 3 | {7, 14, 28, 56, 112, 224} |
| 4 | {18, 36, 72, 144, 288} |
| 5 | {11, 22, 44, 88, 176, 352} |
| 6 | {26, 52, 104, 208} |
| 7 | {15, 30, 60, 120, 240} |

When 16 is included as a TBS, a lifting size set for $i_{LS}$=1 is changed to {6, 12, 24, 48, 96, 192, 384} in Table 9, and when 8 is included as a TBS, a lifting size set for $i_{LS}$=0 is changed to {4, 8, 16, 32, 64, 128, 256}.

According to CBS Determination Method 1 and CBS Determination Method 2, a process of differently determining the $K_b$ value according to the LDPC base graph is included in operation 2, and in 5G NR, the LDPC base graph is determined based on a TBS value and a code rate indicated in the MCS as follows:

When A≤292, or, A≤3824 and R≤0.67, or R≤0.25, LDPC encoding is performed by using LDPC base graph 2.

Otherwise, LDPC encoding is performed by using LDPC base graph 1.

As described above, in 5G NR, because different ranges of TBS values and code rates are used for LDPC base graph 1 and base graph 2, Table 9 is applied to LDPC base graph 2, and lifting sizes as shown in Table 10 may be applied to LDPC base graph 1.

TABLE 10

| Set index ($i_{LS}$) | Set of lifting sizes for LDPC base graph 1 (Z) |
| --- | --- |
| 0 | {16, 32, 64, 128, 256} |
| 1 | {24, 48, 96, 192, 384} |
| 2 | {20, 40, 80, 160, 320} |
| 3 | {14, 28, 56, 112, 224} |
| 4 | {18, 36, 72, 144, 288} |
| 5 | {22, 44, 88, 176, 352} |
| 6 | {26, 52, 104, 208} |
| 7 | {15, 30, 60, 120, 240} |

The LDPC base graph may be basically determined based on the TBS and the code rate, but may also be determined based on an MCS index in a configured MCS table. For example, when one of MCS index tables for a PDSCH and MCS index tables for a PUSCH is configured, the LDPC base graph may be determined according to a TBS value and an MCS table index corresponding to the reference code rate in the configured MCS table, and then LDPC encoding or decoding may be performed.

For reference, according to CBS Determination Method 1 and CBS Determination Method 2, the input bit sequence B may be represented by the sum of a TBS A and a CRC bit size $L_{TB}$, i.e., B=A+$L_{TB}$. Here, the CRC bit size $L_{TB}$ for the TB is configured differently according to the TBS as follows:

When A>3324, $L_{TB}$=24, otherwise, $L_{TB}$=16.

In TBS Determination Method 1, TBS Determination Method 2, TBS Determination Method 3, and TBS Determination Method 4, the $L_{TB}$ for a TBS greater than 3824 or less than 3840, which is not defined therein, may be defined as follows:

When A≥3840, $L_{TB}$=24, otherwise, $L_{TB}$=16.

In a communication system according to various embodiments of the disclosure, a TBS may be calculated through the following operations: (Although each calculation operation is described in detail with respect to a PDSCH in an embodiment of the disclosure, the operations may also be applied to a PUSCH in the same or similar manner. For example, parameters required to determine $N_{RE}$, which is the number of Res for the PUSCH, or a TBS, may be configured based on the number of OFDM symbols allocated for the PUSCH, the DMRS type, and overhead values set per RB/PRB.)

TBS Determination Method 1

Operation 1: $N_{RE}'$, which is the number of Res allocated to PDSCH mapping in one PRB in allocated resources, may be determined by Equation 6.

$$N_{RE}'=N_{sc}^{RB} \cdot N_{symb}^{sh} - N_{DMRS}^{PRB} - N_{oh}^{PRB}, \quad \text{Equation 6}$$

Here, $N_{sc}^{RB}$ denotes the number of subcarriers (e.g., 12) included in one RB, $N_{symb}^{sh}$ denotes the number of OFDM symbols allocated to the PDSCH, $N_{DMRS}^{PRB}$ denotes the number of Res in one PRB occupied by DMRSs of the same code division multiplexing (CDM) group, and $N_{oh}^{PRB}$ denotes the number of Res (e.g., set to one of 0, 6, 12, and 18) occupied by an overhead in one PRB configured by higher layer signaling. Thereafter, the total number $N_{RE}$ of Res allocated to the PDSCH may be determined by Equation 7.

$$N_{RE}=\min(156, N_{RE}') \cdot n_{PRB}. \quad \text{Equation 7}$$

$n_{PRB}$ denotes the number of PRBs allocated to the terminal.

Operation 2: The number $N_{info}$ of temporary information bits may be determined by Equation 8.

$$N_{info}=N_{RE} \cdot R \cdot Q_m \cdot v. \quad \text{Equation 8}$$

Here, R denotes a code rate, $Q_m$ denotes a modulation order, and v denotes the number of allocated layers. The code rate and the modulation order may be transmitted by using an MCS field included in control information and a predefined corresponding relationship. When $N_{info}$≤3624, the TBS may be calculated according to operation 3 below, and otherwise, the TBS may be calculated according to operation 4 below.

Operation 3: $N_{info}'$ may be determined by Equation 9.

$$N'_{info} = \max\left(24, 2^n \cdot \left\lfloor \frac{N_{info}}{2^n} \right\rfloor\right), \quad \text{Equation 9}$$

$$n = \max(3, \lfloor \log_2(N_{info}) \rfloor - 6)$$

Here, the TBS may be determined to be a value closest to among values not less than $N_{info}'$ in Table 11.

TABLE 11

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Operation 4: $N_{info}'$ may be determined by Equation 10.

$$N'_{info} = \max\left(3840, 2^n \times \text{round}\left(\frac{N_{info} - 24}{2^n}\right)\right), \quad \text{Equation 10}$$

$$n = \lfloor \log_2(N_{info} - 24) \rfloor - 5$$

In addition, the TBS may be determined by using $N_{info}'$ and pseudocode like Equation 11.

Equation 11

```
if R ≤ 1/4
```
$$TBS = 8 * C * \left\lceil \frac{N'_{info} + 24}{8 * C} \right\rceil - 24, \text{ where } C = \left\lceil \frac{N'_{info} + 24}{3816} \right\rceil$$
```
else
    if N_info' > 8424
```
$$TBS = 8 * C * \left\lceil \frac{N'_{info} + 24}{8 * C} \right\rceil - 24, \text{ where } C = \left\lceil \frac{N'_{info} + 24}{8424} \right\rceil$$
```
    else
```
$$TBS = 8 * \left\lceil \frac{N'_{info} + 24}{8} \right\rceil - 24$$
```
    end if
end if
```

In a 5G NR system, for a PDSCH allocated by a PDCCH having DCI format 1_0 CRC-scrambled by a paging RNTI (P-RNTI), a random-access RNTI (RA-RNTI), or an MsgB-RNTI, a scaling factor S is applied in a process of calculating $N_{info}$ as follows: $N_{info} = S \cdot N_{RE} \cdot R \cdot Q_m \cdot v$ Here, S is 1, 0.5, 0.25, or the like, and $N_{info}$ is still a positive rational number.

According to TBS Determination Method 1, the TBS is accurately determined by using certain calculation and the TBS table of Table 11 according to the range of $N_{info}$. That is, in order to perform TBS Determination Method 1, the terminal or the base station needs to store the TBS table of Table 11. For reference, in operation 4 of TBS Determination Method 1, when it is unable to set a reference value $R=\frac{1}{4}$ or $N_{info}'=8424$, by which the operation is initiated, the reference value may be actually changed to a reference value that can be set in the system. For example, in a 5G NR system conforming to 3GPP TS 38.212, the highest code rate satisfying $R \leq \frac{1}{4}$ is $251/1024$, and thus the condition may be changed to $R \leq 251/1024$. Similarly, because $N_{info}'$ does not satisfy $8192 < N_{info}' < 8448$ due to quantization, the condition $N_{info}' > 8424$ may be changed to $N_{info}' > 8192$ or $N_{info}' \geq 8448$. Alternatively, the condition may be based on for example, $N_{info} \geq 8344$. In addition, in operation 4, $$\left\lceil \frac{N_{info}' + 24}{8 \cdot C} \right\rceil, \left\lceil \frac{N_{info}' + 24}{3816} \right\rceil, \left\lceil \frac{N_{info}' + 24}{8424} \right\rceil,$$

and the like may be more simply represented by using a result of calculating $$\frac{N_{info}}{8}, \frac{N_{info}'}{8}, \text{ or } \frac{N_{info}' + 24}{8}.$$

For example, when $$N_{info}'' = \frac{N_{info}' + 24}{8},$$

the calculation may be performed more simply, for example, $$C = \left\lceil \frac{N_{info}' + 24}{3816} \right\rceil = \left\lceil \frac{N_{info}''}{477} \right\rceil, \text{ or}$$

$$C = \left\lceil \frac{N_{info}' + 24}{8424} \right\rceil = \left\lceil \frac{N_{info}''}{1053} \right\rceil \text{ and}$$

$$\left\lceil \frac{N_{info}' + 24}{8 \cdot C} \right\rceil = \left\lceil \frac{N_{info}''}{C} \right\rceil.$$

In $\frac{N_{info}' + 24}{8}$, $N_{info}'+24$ is always a multiple of 8 and $\frac{1}{8}$ is $2^{-3}$, and thus the calculation may be easily implemented by performing a bit-shift operation on an integer.

TBS Determination Method 1 includes using the intermediate value $N_{info}$, which is a rational number, or determining the TBS, from operation 3 (i.e., after a certain method for TBS determination is determined). However, in TBS Determination Method 1, when the TBS is determined from the beginning by determining the intermediate value to be an integer by using a floor function, a ceiling function, a round function, or the like, all processes for TBS determination consist of integer-based operations, and thus are significantly simple. (e.g., $N_{info} \triangleq \lfloor N_{RE} \cdot Q_m \cdot v \cdot R \rfloor$)

However, this method requires attention because it is possible that backward compatibility with the 5G NR system defined in 3GPP Release-15 is not maintained. For example, when $N_{info}$ is between 3824 and 3825 (i.e., $3824 < N_{info} < 3825$), and is used as the intermediate value, the value is 3824, and thus, it is necessary to use a table (e.g., Table 11) corresponding to TBS candidates, which are defined as a plurality of integers, and a calculation-based TBS determination method. However, in the current 5G NR standard, a calculation-based TBS determination method needs to be used without a table when $N_{info} > 3824$, and thus different TBS values are determined.

In the disclosure, a method of minimizing computational complexity while completely or maximally maintaining backward compatibility with 5G NR standard Release-15 or Release-16 when determining a TBS based on an integer form such as $\lfloor N_{RE} \cdot Q_m \cdot v \cdot R \rfloor$ or $\lceil N_{RE} \cdot Q_m \cdot v \cdot R \rceil$ will be described.

In general, in hardware, processing positive integers is more convenient than processing positive rational numbers, and thus, in TBS Determination Method 1, by converting $N_{info}$ into an integer by using a floor function, a ceiling function, a round function, or the like, and then applying the operation, the computational complexity may be further reduced. For example, in TBS Determination Method 1, $N_{info}$ is calculated and then compared with a first reference value (e.g., 3824) to select a method of determining a TBS, then, in the actual operation, integers such as $\lfloor N_{info} \rfloor$ are determined, and then these values are plugged into respective equations for calculation.

The process is summarized as TBS Determination Method 2 below.

TBS Determination Method 2

Operation 1: Same as operation 1 of TBS Determination Method 1

Operation 2: Determine a temporary intermediate value $N_{info\_temp} = N_{RE} \cdot Q_m \cdot v \cdot R$.

When $N_{info\_temp} = 3624$, determine the TBS based on operation 3, and when $N_{info\_temp} > 3824$, determine the TBS based on operation 4. Here, in operations 3 and 4, the calculation is performed based on an integer intermediate value $N_{info} = \lfloor N_{info\_temp} \rfloor = \lfloor N_{RE} \cdot Q_m \cdot v \cdot R \rfloor$.

Operations 3 and 4: Same as operations 3 and 4 of TBS Determination Method 1, respectively Although it is possible to prove, by using the following two lemmas, that the method of determining a TBS by using $N_{info} = \lfloor N_{info\_temp} \rfloor$, which is an integer, instead of an intermediate value, which is generally a rational number, from operation 3 in TBS Determination Method 2 (i.e., after a certain method for TBS determination is determined) outputs the same result as that of TBS Determination Method 1, a detailed description thereof will be omitted.

Lemma 1: For arbitrary positive integers x, m, and n, and a positive real number y, $$\left\lfloor \frac{\left\lfloor \frac{y}{x^m} \right\rfloor}{x^n} \right\rfloor = \left\lfloor \frac{y}{x^{m+n}} \right\rfloor.$$

Lemma 2: For a positive integer $n(\geq 3)$, which is greater than or equal to 3, and a positive real number $y(\geq 2^{n+3})$, which is greater than or equal to $2^{n+3}$, $$\text{Round}\left( \frac{\left\lfloor \frac{y}{s} \right\rfloor - 3}{2^n} \right) = \text{Round}\left( \frac{y - 24}{2^{n+s}} \right).$$

Hereinafter, a method of transmitting and receiving a TB considering transmission coverage will be described. Typically, a TB corresponds to one or more code blocks, and at least some or all of encoded code blocks or codewords obtained by performing channel encoding on the one or more code blocks are transmitted on a PDSCH or a PUSCH. In the disclosure, for convenience, processes of transmitting and receiving such TBs may be simply described as, for example, "transmission or transmission/reception of TBs". In addition, although a PUSCH will be described as an example in various embodiments of the disclosure, the use in a PDSCH is not excluded. Furthermore, although a 5G NR system will be described in detail in various embodiments of the disclosure, the application in evolved LTE systems and other communication systems is not excluded.

Figure 8:
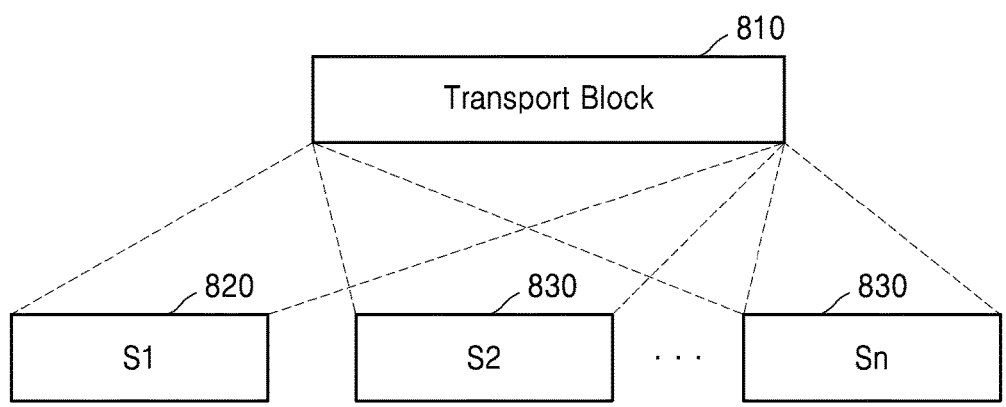
FIG. 8 illustrates one transport block (TB) being transmitted on n physical uplink shared channels (PUSCHs), according to an embodiment of the disclosure.

FIG. 8 is a diagram illustrating one TB being transmitted on n PUSCHs, according to an embodiment of the disclosure. FIG. 8 is a diagram illustrating a method of transmitting and receiving one TB.

Figure 9:
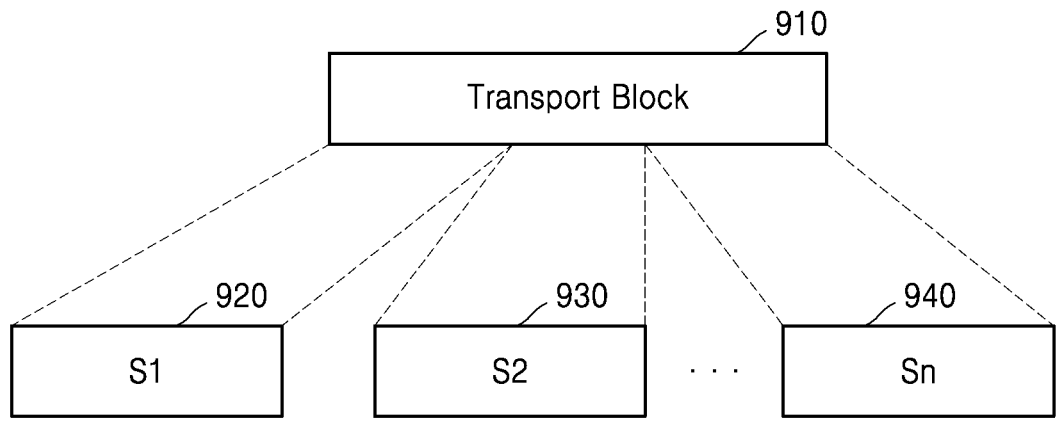
FIG. 9 illustrates one TB being divided and transmitted on n PUSCHs, according to an embodiment of the disclosure.

Referring to FIG. 8, one of methods of increasing the transmission coverage for a base station is to repeatedly transmit information from a terminal to the base station (or information from the base station to the terminal). FIG. 8 illustrates an example in which a terminal repeatedly transmits a TB 810 to a base station. FIG. 8 illustrates that the same TB is repeatedly transmitted on n PUSCHs, and FIG. 9 illustrates that one TB is divided and transmitted on n PUSCHs S1 810, S2 820, . . . Sn 830.

FIG. 9 is a diagram illustrating one TB being divided and transmitted on n PUSCHs, according to an embodiment of the disclosure. In the case of FIG. 9, because one TB 910 is transmitted and received over the n PUSCHs, a receiver needs to bundle reference signals (e.g., DMRSs, sounding reference signals (SRSs), etc., and DMRSs, channel-state information reference signals (CSI-RS s), etc. in the case of PDSCHs) transmitted and received over the n PUSCHs, perform channel estimation, and then perform data demodulation/decoding. Therefore, time domain bundling is not supported and channel estimation is performed for each PUSCH in the case of FIG. 8, whereas, by using the method of FIG. 9, the reception signal-to-noise ratio (SNR) of the receiver may be further improved than that in the case of FIG. 8. Here, that the reception SNR is high means that the base station is able to receive data better from a terminal farther away from the base station, and thus increase its coverage. As another example, a TB is determined by a modulation order, a code rate, the number of layers, and the number of resources as shown in Equation 8, and in order to support a low code rate for a given TB, a greater number of resources is generally allocated. The number of resources is determined based on frequency and time resources, and because a terminal located at a cell boundary has limited maximum transmission power, it may be difficult for the terminal to be allocated a wide range of frequency resources from a base station. Therefore, when the frequency resources are limited, there is a limitation in lowering the code rate for a TB in order to increase the transmission coverage, and thus, allocating more time resources may be an alternative. Accordingly, the method illustrated in FIG. 9 may be considered as an appropriate scheduling method when a low code rate is required to improve the transmission coverage for, for example, a terminal at a cell boundary.

Figure 10:
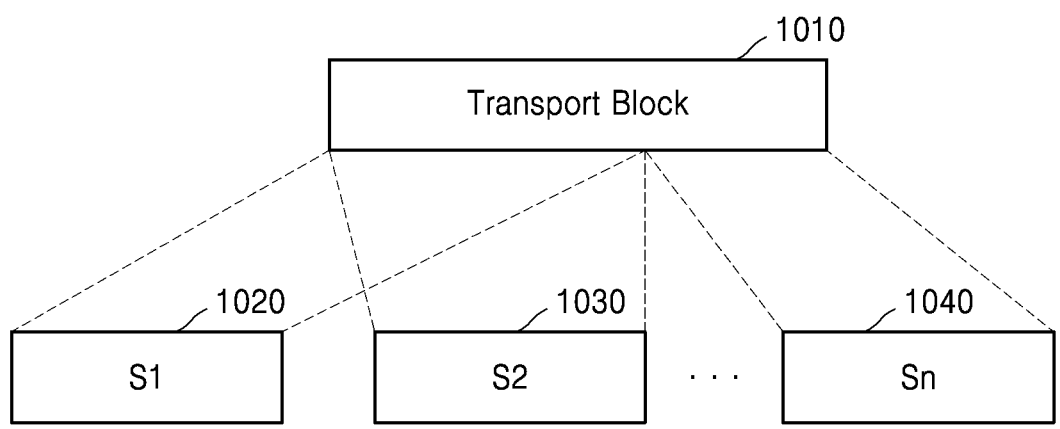
FIG. 10 illustrates one TB being divided and transmitted on n PUSCHs, according to an embodiment of the disclosure.

Referring to FIG. 9, according to an embodiment of the disclosure, the size of a TB may be determined based on one slot, the TB may correspond to one or more code blocks, and at least some or all of encoded code blocks or codewords obtained by performing channel encoding on the one or more code blocks may be repeatedly transmitted over slots S1, 920 S2 930, . . . , and Sn 940. As another example, the size of a TB is determined based on one or more slots, the TB corresponds to one or more code blocks, and at least some or all of encoded code blocks or codewords obtained by performing channel encoding on the one or more code blocks may be divided and transmitted over the slots S1, S2, . . . , and Sn. As yet another example, the size of a TB is determined based on one or more slots, the TB corresponds to one or more code blocks, and at least some or all of encoded code blocks or codewords obtained by performing channel encoding on the one or more code blocks may be repeatedly transmitted over the slots S1, S2, . . . , and Sn. Transmitting at least some or all of encoded code blocks or codewords for one TB over a plurality of slots may be performed by repeatedly transmitting as illustrated in FIG. 8, transmitting portions of the TB respectively over the plurality of slots as illustrated in FIG. 9, or repeatedly transmitting some portions of the TB and transmitting the remaining portions of the TB not repeatedly as illustrated in FIG. 10. In addition, it is possible to perform a repetitive transmission process on some portions of the TB, and perform another repetitive transmission process on the remaining portions of the TB.

FIG. 10 illustrates one TB being divided and transmitted on n PUSCHs, according to an embodiment of the disclosure.

Referring to FIG. 10, by transmitting and receiving one TB 1010 through several slots 1020, 1030, and 1040 as described above, it is easy to increase transmission coverage or achieve other advantages. In particular, when sufficient time resources are used, the code rate may be set to be sufficiently low, and thus the transmission coverage may be further increased. However, the size of a TB is proportional to the amount of allocated resources and the code rate, and because the minimum value of the code rate is generally determined in a system, as the amount of allocable resources greatly increases, the size of the TB also greatly increases, and in this case, negative effects such as an increase in complexity and a delay in processing one TB in a higher layer may occur. That is, it may be said that an increase in transmission coverage, which may be obtained by increasing the amount of allocable time resources, is in a trade-off relationship with transmission/reception complexity, a delay, and the like.

The easiest way to minimize the maximum transmission/reception complexity and a delay in a system while obtaining the effect of increasing transmission coverage is to set the maximum value of a TBS to be equal to that in a method in the related art. That is, there is a method of setting a TBS not to be greater than the maximum value of a TBS in a system in the related art that transmits a TB through one slot. Hereinafter, a method of setting the size of a TB transmitted through multiple slots (TB on multi-slot (TBoMS)) to be less than or equal to the size of a TB in a system in the related art will be described. The applicability of the method depends on the capability of a terminal. For example, there may be terminals that support or do not support TBoMS. Alternatively, the method may be operated according to a base station configuration. For example, even in the case of terminals that support TBoMS, the terminals may calculate a TBS by using different methods according to whether a TBoMS-related configuration is set.

First, for comparison, an example of maximum values of a TBS obtained by applying TBS Determination Method 1 to FR1 in an existing Release-15/16 5G NR system is shown Table 12.

TABLE 12

|  |  | 64QAM | 256QAM | Low 64QAM |
|---|---|---|---|---|
| 15 kHz (270 RB) | v = 1 | 233608 | 311368 | 176208 |
|  | 2 | 467240 | 622760 | 352440 |
|  | 3 | 704904 | 934152 | 524640 |
|  | 4 | 934152 | 1245544 | 704904 |
| 30 kHz (273 RB) | v = 1 | 237776 | 319784 | 1180376 |
|  | 2 | 475584 | 638984 | 360488 |
|  | 3 | 704904 | 950984 | 540776 |
|  | 4 | 950984 | 1277992 | 721000 |
| 60 kHz (135 RB) | v = 1 | 116792 | 155776 | 96264 |
|  | 2 | 233608 | 311368 | 192624 |
|  | 3 | 352440 | 467240 | 286976 |
|  | 4 | 462240 | 622760 | 385272 |

According to Equation 8 of TBS Determination Method 1, because the TBS depends on $N_{info}=N_{RE} \cdot R \cdot Q_m \cdot v$, the TBS is a maximum when $N_{info}$ is a maximum. Here, because the maximum value of R is determined according to the MCS table, $N_{RE}=\min(156, N_{RE}') \cdot n_{PRB}$ has to be a maximum in order for $N_{info}$ to be a maximum for given $Q_m$ and v. In addition, when $n_{PRB}$ is a maximum, $N_{RE}$ is also a maximum, and in the SCS, maximum values for $n_{PRB}$ are given as shown in Table 1 for FR1, and in Table 2 for FR2.

As described above, when there is a limitation for each parameter that determines $n_{info}$, the maximum value of the TBS may be effectively determined. Hereinafter, a method of effectively determining the maximum value of a TBS by limiting each parameter will be described in TBS Determination Method 3 and TBS Determination Method 4.

TBS Determination Method 3

In determining the TBS considering TBoMS, in order to set the maximum value of the TBS to be less than or equal to that in a 5G NR system of the related art with respect to given R, $Q_m$, and v, the maximum value of F may be set. An example of a method of setting the maximum value of $N_{RE}$ is to set the maximum value of $n_{PRB}$. (Hereinafter, for convenience of descriptions, maximum values of $n_{PRB}$ obtained considering various configurations may be collectively referred to as $n_{PRB}^{max}$. This is applied to TBS Determination Method 3 and all subsequent embodiments.)

As shown in Table 1 and Table 2, the allocable maximum value of $n_{PRB}$ is determined according to FR1/FR2, an SCS, and a channel bandwidth. Accordingly, the maximum value of $n_{PRB}$ may be set based on at least one of FR1/FR2, an SCS, or a channel bandwidth. For example, when the maximum value of $n_{PRB}$ is set based on FR1/FR2, $n_{PRB,FR(1)}^{max}$, which corresponds to FR1, may be set to 273 and $n_{PRB,FR(2)}^{max}$, which corresponds to FR2, may be set to 264. Alternatively, when the maximum value of n PRE is set based on FR1/FR2 and an SCS, $n_{PRB,SCS=15kHz}$, which corresponds to FR1 and SCS=15 kHz, may be set to 270, $n_{PRB,SCS=30kHz}$, which corresponds to FR1 and SCS=30 kHz, may be set to 273, and $n_{PRB,SCS=60kHz}$, which corresponds to FR1 and SCS=60 kHz, may be set to 135, and because the maximum value of $n_{PRB}$ is 264 for SCS=60 kHz or SCS=120 kHz in FR2, and $n_{PRB,FR(2)}^{max}$, which corresponds to FR2, may be always set to 264 for any SCS. In addition, based on the maximum value of $n_{PRB}$ that is configurable for each channel bandwidth according to Table 1 and Table 2, a maximum value of $n_{PRB}$ required to determine the TBS considering TBoMS may be set.

As a detailed example, there may be a method of limiting $n_{PRB}$ of $N_{RE}=\min(156, N_{RE}') \cdot n_{PRB}$ in Equation 7, as shown in Equation 12.

For an SCS or A corresponding to the SCS as shown in Table 13, $$N_{RE}=\min(156, N_{RE}') \cdot \min^*(n_{PRB}^{max}(\mu), n_{PRB}). \quad \text{Equation 12}$$

Here, $n_{PRB}^{max}(\mu)$ (or $n_{PRB}^{max}(SCS)$) that is a maximum value of $n_{PRB}$ configurable for FR1 is shown in Table 13.

TABLE 13

| $\mu$ | SCS ($\Delta f = 2^\mu \cdot 15$ [KHz]) | $\eta_{PRB}^{max}(\mu)$ (or $\eta_{PRB}^{max}(SCS)$) |
|---|---|---|
| 0 | 15 | 270 |
| 1 | 30 | 273 |
| 2 | 60 | 135 |

TABLE 14

| $\mu$ | SCS ($\Delta f = 2^\mu \cdot 15$ [KHz]) | $\eta_{PRB}^{max}(\mu)$ (or $\eta_{PRB}^{max}(SCS)$) |
|---|---|---|
| 2 | 60 | 264 |
| 3 | 120 | 264 |

Equation 12 is only an example, and the maximum value of $n_{PRB}$ may be set considering FR1/FR2, an SCS, and a channel bandwidth as shown in Equation 13.

$$n_{RB}=\min(156, N_{RE}') \cdot \min(n_{PRB}^{max}(FR(i), \mu, BW_{FR(i)}(k)), n_{PRB})$$

$$(\text{or}, N_{RE}=\min(156, N_{RE}') \cdot \min(n_{PRB}^{max}(FR(i), SCS(j), BW(k)), n_{PRB}))$$

$$i=1,2, j=1,2,3, \ldots, k=1,2,3, \ldots \quad \text{Equation 13}$$

Here, FR(1) denotes FR1, FR(2) denotes FR2, SCS(j) denotes each SCS, $BW_{FR(i)}(k)$ denotes a channel bandwidth according to FR(i) (e.g., for FR1, BW(1)=5, BW(2)=10, BW(3)=15, ..., for FR2, BW(1)=50, BW(2)=100, ...), and $n_{PRB}^{max}*FR(i), \mu, BW(k))$ or $n_{PRB}^{max}(FR(i), SCS(j), BW(k))$ according to each parameter follows [Table 1] and [Table 2], or [Table 13] and [Table 14]. Each of the parameters FR(i), $\mu$, and $BW_{FR(i)}(k)$ of $n_{PRB}^{max}(FR(i), \mu, BW_{FR(i)}(k))$ in Equation 13 may be excluded according to a condition for setting the maximum value of $n_{PRB}$. For example, when the maximum value of n PES is set regardless of the channel bandwidth, $BW_{FR(i)}(k)$ may be excluded. As another example, when TBoMS is considered for only one of FR1 or FR2, the condition and related index for FR(i) in Equation 13 may be excluded. (This is also applied to SCS, but a detailed description thereof will be omitted. Also, when all indices are removed, the equation may contain only a constant.)

As another method, the highest value or a certain value may be selected from among the maximum values of $n_{PRB}$ FIE that may be determined based on at least one of FR1/FR2, the SCS, or the channel bandwidth, to limit $n_{PRB}$ in a simple manner as shown in Equation 14.

For $FR1, N_{RE}=\min(156, N_{RE}') \cdot \min(273, n_{PRB})$

For $FR2, N_{RE}=\min(156, N_{RE}') \cdot \min(264, n_{PRB}) \quad \text{Equation 14}$ In Equation 14, the values 273 and 264, which are determined as $n_{PRB}^{max}$, denote the maximum values of $N_{RE}$ in Table 1 and Table 2, respectively. Of course, the values set as $n_{PRB}^{max}$ may be determined as one of the maximum value for a certain channel bandwidth or the maximum value for a certain SCS in Table 1 or Table 2. In addition, in Equation 14, $N_{RE}$ may be determined based on one equation (e.g., $N_{RE}=\min(156, N_{RE}') \cdot \min(273, n_{PRB})$) with $n_{PRB}$ regardless of FR1/FR2.

In the case of a TBoMS, i.e., a TB to be transmitted over n slots, when $n_{PRB}^{max}$ is appropriately determined as in the above embodiments of the disclosure, a condition like Equation 15 has to be satisfied. When the TB is transmitted over n slots, i.e., for a TBoMS, Equation 15 has to be always true, when the same amount of PRBs is allocated to the respective slots, or even when different amounts of PRBs are allocated to the respective slots.

Let $n_{PRB}^{max}$ be the maximum number of PRBs allocable for a TBoMS. When the TB is transmitted over n slots, the number $n_{PRB}$ of PRBs allocated for a PUSCH or PDSCH in at least one of the n slots satisfies the following:

$$n_{PRB} \le \left\lfloor \frac{n_{PRB}^{max}}{n} \right\rfloor. \qquad \text{Equation 15}$$

Consequently, the following is true for the number $N_{RE}$ of REs allocated in the slot:

$$N_{RE} \le \left\lfloor \frac{\min(156, N'_{RE}) \cdot n_{PRB}^{max}}{n} \right\rfloor \le \left\lfloor \frac{156 \cdot n_{PRB}^{max}}{n} \right\rfloor$$

(Here, $N_{RE}'$ is shown in Equation 6.)

According to Equation 15, in a system that allocates the same amount of PRBs to slots for a TBoMS, a maximum number of actually allocable PRBs may be $$n_{PRB,TBoMS}^{max} = n \times \left\lfloor \frac{n_{PRB}^{max}}{n} \right\rfloor.$$

In other words, even when the system has determined $n_{PRB}^{max}$ considering various configurations or parameters, only up to $$\left\lfloor \frac{n_{PRB}^{max}}{n} \right\rfloor$$

PRBs are allocable to each slot, and consequently, the actual maximum number of PRBs that may be transmitted over the n slots may or may not decrease depending on the number n of slots.

In determining the TBS considering TBoMS as described above, in a system that allocates the same amount of PRBs to each slot, the maximum number of PRBs may also be determined by additionally considering the number of slots for transmitting a TB. Equation 16 is an example of such an approach.

When one TB is transmitted over n slots, the number of REs is determined as follows:

$$N_{RE} = \min(156, N'_{RE}) \cdot \min\left(n \times \left\lfloor \frac{n_{PRB}^{max}}{n} \right\rfloor, n_{PRB}\right). \qquad \text{Equation 16}$$

Here, $n_{PRB}^{max}$ denotes the maximum number of PRBs that may be determined by various embodiments of the disclosure (including TBS Determination Method 4 and all subsequent embodiments). (That is, $n_{PRB}^{max}$ may be a constant or a variable value determined by various parameters.)

As a particular example of using Equation 16, a combination of Equation 16 and Equation 13 may be Equation 17.

$$N_{RE} = \qquad \text{Equation 17}$$
$$\min(156, N'_{RE}) \cdot \min\left(n \times \left\lfloor \frac{n_{PRB}^{max}(FR(i), \mu, BW_{FR(i)}(k))}{n} \right\rfloor, n_{PRB}\right)$$

Here, as in Equation 13, at least one or all of the indices FR(i), μ, and $BW_{FR(i)}(k)$ may be excluded depending on the system. When all of them are excluded, the equation contains only a constant.

When a TBoMS is applied and there is a particular restriction on the number of slots, Equation 16 or Equation 17 may be changed to, for example, $n_{RB}$=min(156, $N_{RE}'$) ·min($n_{PRB}^{max}$, $n_{PRB}$), based on a preset number as in Equation 14. For example, when n is a power of 2, such as 2, 4, 8, or 16, because 272=16*17, a number that does not require consideration of the number of slots may be set in the above equation, i.e., $n_{PRB}^{max}$=272 ⥯. Alternatively, when n is 2, 3, 4, 6, or 8, 264, which is a multiple of 24 that is the least common multiple of the above numbers (i.e., 2, 3, 4, 6, and 8), and is the greatest of numbers less than or equal to 273 (or numbers less than or equal to 270, 273, or 135, according to the SCS), may be considered, i.e., $n_{PRB}^{max}$=264, in the above equation, so as to set the value to a number that does not require consideration of the number of slots. In summary, when one TB is transmitted over n slots, $n_{PRB}^{max}$ may be determined to be a number, which is a common multiple of integers that may be n (i.e., a multiple of the least common multiple of the integers) and is less than or equal to 273 (or less than or equal to 270, 273, or 135, according to the SCS), and then $N_{RE}$ may be calculated by using Equation 14. Of course, conversely, when $n_{PRB}^{max}$ is determined, it is also possible to limit n to divisors of $n_{PRB}^{max}$.

In a system that allocates the same amount of PRBs to each slot for a TBoMS, and has a particular restriction on the number of slots, Table 13 may be modified to Table 15. (For FR2, when the possible numbers of slots are 2, 4, 8, and (16), or 2, 3, 4, (6), and 8, Table 14 is applicable.)

TABLE 15

| | | $n_{PRB}^{max}(\mu)$ (or $n_{PRB}^{max}$(SCS)) | |
| --- | --- | --- | --- |
| μ | SCS ($\Delta f = 2^\mu \cdot$ 15 [kHz]) | POSSIBLE NUMBERS OF SLOTS 2, 4, 8 (16) | POSSIBLE NUMBERS OF SLOTS 2, 3, 4, 6, 8 |
| 0 | 15 | 264 (256) | 264 |
| 1 | 30 | 272 | 264 |
| 2 | 60 | 128 | 120 |

According to another embodiment of the disclosure, for $n_{PRB}^{max}(\mu)$ (or $n_{PRB}^{max}$(SCS)), $n_{PRB}^{max}$ may be determined by Equation 18 where, for convenience, a set S includes the possible numbers of slots.

$$n_{PRB}^{max} = \min_{i \in S}\left(i \times \left\lfloor \frac{n_{PRB}^{max}(\mu)}{i} \right\rfloor\right). \qquad \text{Equation 18}$$

For example, when S={2,4,8}, $n_{PRB}^{max}(0)$ (or $n_{PRB}^{max}$(SCS=15 kHz)) may be determined to be 264, $n_{PRB}^{max}(1)$ (or $n_{PRB}^{max}$(SCS=30 kHz)) may be determined to be 272, and $n_{PRB}^{max}(2)$ (or $n_{PRB}^{max}$(SCS=60 kHz)) may be determined to be 128, and, when S={2,4,8,16}, $n_{PRB}^{max}(0)$ may be determined to be 256, $n_{PRB}^{max}(1)$ may be determined to be 272, and $n_{PRB}^{max}(2)$ may be determined to be 128, and, when S={2,3,4,6,8}, $n_{PRB}^{max}(0)$ may be determined to be 264, $n_{PRB}^{max}(1)$ may be determined to be 270, and $n_{PRB}^{max}(2)$ may be determined to be 128. (In the case of FR2, all of the values are determined to be 264)

In the case of a system that allows both allocating different numbers of PRBs to slots and allocating the same number of PRBs to each of the slots, when allocating different numbers of PRBs to the slots, $n_{PRB}^{max}$ may be determined based on the method corresponding to Equation 12 to Equation 14, whereas, when allocating the same number of PRBs to each slot, $n_{PRB}^{max}$ may be determined based on the method corresponding to Equation 16, Equation 17, or Table 15. In addition, in the two situations described above with the same parameters, the lesser one of the values of $n_{PRB}^{max}$ may be used in common.

The embodiments of the disclosure described above are about a method of controlling the maximum value of a TBS by setting the maximum value of $n_{PRB}$. However, when the maximum number of REs for the maximum value $n_{PRB}^{max}$ of $n_{PRB}$ is $N_{RE}^{max}$, their values have a one-to-one correspondence as in $N_{RE}^{max}=156 \cdot n_{PRB}^{max}$, and thus $N_{RE}^{max}=156 \cdot n_{PRB}^{max}$ may be set to modify Equation 8 to Equation 19 and apply it as a method of controlling the maximum value of a TBS.

$$N_{info}=R \cdot Q_m \cdot v \cdot \min(N_{RE}, N_{RE}^{max}) \qquad \text{Equation 19}$$

As a particular example, $N_{RE}^{max}$ may be 42588 for $n_{PRB}^{max}$ being 273, $N_{RE}^{max}$ may be 42432 for $n_{PRB}^{max}$ being 272, $N_{RE}^{max}$ may be 42120 for $n_{PRB}^{max}$ being 270, $N_{RE}^{max}$ may be 41184 for $n_{PRB}^{max}$ being 264, and $N_{RE}^{max}$ may be 21060 for $n_{PRB}^{max}$ being 135.

Similarly, when $N_{info}^{max}=R \cdot Q_m \cdot v \cdot N_{RE}^{max}=R \cdot Q_m \cdot v \cdot 156 \cdot n_{PRB}^{max}$, Equation 8 may be modified to Equation 20 and applied.

$$N_{info}=\min(N_{info}^{max}, N_{RE} \cdot R \cdot Q_m \cdot v). \qquad \text{Equation 20}$$

In addition, in the same way, when the maximum value of a TBS that may be determined based on $N_{info}=N_{info}^{max}$ is $TBS^{max}$, and the TBS determined by Equation 11 based on $N_{info}=N_{RE} \cdot R \cdot Q_m \cdot v$ is $TBS_{temp}$, the TBS may also be expressed as $TBS=\min(TBS^{max}, TBS_{temp})$. As a particular example, assuming that 256 QAM corresponds to the maximum modulation order supported by the system, according to Table 12, when SCS=30 kHz and $n_{PRB}^{max}$ is 273, by applying v=4 and R=948/1024, $N_{info}=1261669.5$, and $TBS^{max}$ may be set to 1277992, which is the TBS in this case. When $n_{PRB}^{max}$ is set to 272, 270, 264, or 135, $N_{info}$ may be calculated based on the corresponding values, and $TBS^{max}$ may be set to respective TBS values corresponding to the calculated $N_{info}$. In a more general expression, similar to the expressions of Equation 12 to Equation 18, $TBS^{max}$ may also be a constant or a value determined based on at least one of FR1/FR2, an SCS, a channel bandwidth, or the number of slots. As a particular example, when $TBS^{max}$ is determined according to the SCS, $TBS^{max}(\mu)$ corresponding to $n_{PRB}^{max}$ determined by Table 13 to Table 15 may be determined.

In conclusion, a UE may consider that, for $TBS^{max}$, which is a constant or a value determined based on at least one of FR1/FR2, the SCS, the channel bandwidth, or the number of slots, the case where the TBS is greater than $TBS^{max}$ does not occur. For example, referring to Table 12, the UE may consider (or expect) that there is no case where TBS>319784 for v=1, TBS>638984 for v=2, TBS>950984 for v=3, or TBS>1277992 for v=4. The above condition may be limitedly applied only when μ=1 and an MCS table having a maximum modulation order of 8 is configured, or may be applied in correspondence with only the number of layers regardless of the above values. In other words, the maximum value $TBS^{max}$ of the TBS may be set differently according to at least one of v, μ, or the maximum modulation order of the configured MCS table, with reference to Table 12.

As another method, when the base station determines $n_{PRB}$ in Equation 7 and it is always possible to configure such that the values of $n_{PRB}^{max}$ defined in Table 1 and Table 2 for FR1/FR2, SCSs or channel bandwidths are not exceeded, the terminal may perform an existing TBS determination method as it is. In other words, the terminal may consider (or expect) that there is no case where $$n_{PRB} > n_{PRB}^{max}(FR(i), \mu, BW_{FR(i)}(k))$$

and apply the existing TBS determination method as it is.

Similarly, when up to n slots for transmission are considered and the base station is always able to perform configuration such that there is no case where $$n_{PRB} > n \times \left\lfloor \frac{n_{PRB}^{max}(FR(i), \mu, BW_{FR(i)}(k))}{n} \right\rfloor,$$

the terminal may also consider (or expect) that there is no such case and apply the existing TBS determination method as it is. Of course, this is only an example, and, based on $n_{PRB}^{max}$ determined based on at least one of FR1/FR2, the SCS, the channel bandwidth, or the possible number n of slots through various methods, the terminal may consider (or expect) that there is no case where $$n_{PRB} > n_{PRB}^{max}\left(\text{or } \left\lfloor \frac{n_{PRB}^{max}}{n} \right\rfloor\right)$$

and apply the existing TBS determination method as it is. The base station has to perform configuration such that is $$n_{PRB} \leq n_{PRB}^{max}\left(\text{or } \left\lfloor \frac{n_{PRB}^{max}}{n} \right\rfloor\right)$$

satisfied, and when a configuration for which $$n_{PRB} > n_{PRB}^{max}\left(\text{or } \left\lfloor \frac{n_{PRB}^{max}}{n} \right\rfloor\right)$$

is true is set, a reception error may occur.

For reference, $n_{PRB}^{max}$ in the above description denotes the maximum number of PRBs that may be determined by various embodiments of the disclosure (including TBS Determination Method 3 and all subsequent embodiments). (That is, $n_{PRB}^{max}$ may be a constant or a variable value determined by various parameters.) In addition, after the system configures an MCS table, e.g., one of MCS tables as shown in Table 16 to Table 20, R, $Q_m$, and the like may be determined based on an MCS index indicated based on the corresponding MCS table.

TABLE 16

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 17

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 18

| MCS Index $I_{MCS}$ | Modulation Order Qm | Target code Rate [R × 1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

TABLE 19

| MCS Index $I_{MCS}$ | Modulation Order Qm | Target code Rate [R × 1024] | Spectral efficiency |
|---|---|---|---|
| 0 | q | 240/q | 0.2344 |
| 1 | q | 314/q | 0.3770 |
| 2 | 2 | 193 | 0.6016 |
| 3 | 2 | 251 | 0.8770 |
| 4 | 2 | 308 | 1.1758 |
| 5 | 2 | 379 | 1.4766 |
| 6 | 2 | 449 | 1.6953 |
| 7 | 2 | 526 | 1.9141 |
| 8 | 2 | 602 | 2.1602 |
| 9 | 2 | 679 | 2.4063 |
| 10 | 4 | 340 | 2.5703 |
| 11 | 4 | 378 | 2.7305 |
| 12 | 4 | 434 | 3.0293 |
| 13 | 4 | 490 | 3.3223 |
| 14 | 4 | 553 | 3.6094 |
| 15 | 4 | 616 | 3.9023 |
| 16 | 4 | 658 | 4.2129 |
| 17 | 6 | 466 | 4.5234 |
| 18 | 6 | 517 | 4.8164 |
| 19 | 6 | 567 | 5.1152 |
| 20 | 6 | 616 | 5.3320 |
| 21 | 6 | 666 | 5.5547 |
| 22 | 6 | 719 | 5.8906 |
| 23 | 6 | 772 | 6.2266 |
| 24 | 6 | 822 | 6.5703 |
| 25 | 6 | 873 | 6.9141 |
| 26 | 6 | 910 | 7.1602 |
| 27 | 6 | 948 | 7.4063 |
| 28 | q | reserved | |
| 29 | 2 | reserved | |
| 30 | 4 | reserved | |
| 31 | 6 | reserved | |

TABLE 20

| MCS Index $I_{MCS}$ | Modulation Order Qm | Target code Rate [R x 1024] | Spectral efficiency |
|---|---|---|---|
| 0 | q | 60/q | 0.2344 |
| 1 | q | 80/q | 0.3770 |
| 2 | q | 100/q | 0.6016 |
| 3 | q | 128/q | 0.8770 |
| 4 | q | 156/q | 1.1758 |
| 5 | q | 198/q | 1.4766 |
| 6 | 2 | 120 | 1.6953 |
| 7 | 2 | 157 | 1.9141 |
| 8 | 2 | 193 | 2.1602 |
| 9 | 2 | 251 | 2.4063 |
| 10 | 2 | 308 | 2.5703 |
| 11 | 2 | 379 | 2.7305 |
| 12 | 2 | 449 | 3.0293 |
| 13 | 2 | 526 | 3.3223 |
| 14 | 2 | 602 | 3.6094 |
| 15 | 2 | 679 | 3.9023 |
| 16 | 4 | 378 | 4.2129 |
| 17 | 4 | 434 | 4.5234 |
| 18 | 4 | 490 | 4.8164 |
| 19 | 4 | 553 | 5.1152 |
| 20 | 4 | 616 | 5.3320 |
| 21 | 4 | 658 | 5.5547 |
| 22 | 4 | 699 | 5.8906 |
| 23 | 4 | 772 | 6.2266 |
| 24 | 6 | 567 | 6.5703 |
| 25 | 6 | 616 | 6.9141 |
| 26 | 6 | 666 | 7.1602 |
| 27 | 6 | 772 | 7.4063 |
| 28 | q | | reserved |
| 29 | 2 | | reserved |
| 30 | 4 | | reserved |
| 31 | 6 | | reserved |

Table 16 to Table 20 may be used in the case of determining or configuring an MCS when a maximum of 64 QAM or a maximum of 256 QAM is available for a PDSCH or a PUSCH. Table 19 and Table 20 may be used for a PUSCH when determining or configuring an MCS for a PUSCH to which transform precoding and 64 QAM are applied. (q in Table 19 and Table 20 denotes a value determined depending on whether pi/2-BPSK is indicated, and, when tp-pi2BPSK is set in higher layer signaling, q=1, otherwise, q=2.) The values of respective indices in the MCS tables of Table 16 to Table 20 may be set through a 5-bit indicator. In particular, Table 16 is a basic MCS table and is used in all cases where there is no certain MCS table-related configuration, Table 17 is used when an MCS table-related parameter (e.g., mcs-Table) is set to 'qam256' in higher layer signaling pdsch-Config or pusch-Config, and Table 18 is used when the parameter is set to 'qam64LowSE'. In particular, Table 18 is an MCS table used when a CQI table is configured such that a target TB error probability corresponds to 0.00001 as follows:

The CQI indices and their interpretations are given in Table 5.2.2.1-2 or Table 5.2.2.1-4 for reporting CQI based on QPSK, 16 QAM, and 64 QAM. The CQI indices and their interpretations are given in Table 5.2.2.1-3 for reporting CQI based on QPSK, 16 QAM, 64 QAM and 256 QAM.

Unless specified otherwise in this clause, based on an unrestricted observation interval in a time domain, and an unrestricted observation interval in a frequency domain, the UE shall derive, for each CQI value reported in a UL slot n, the highest CQI index which satisfies the following condition:

A single PDSCH TB with a combination of modulation scheme, a target code rate, and a TBS corresponding to the CQI index, and occupying a group of DL PRBs termed the CSI reference resource, may be received as a TB with an error probability not exceeding a preset value.

TBS Determination Method 4

In TBS Determination Method 3, a method of setting a TBS not to exceed a certain value by controlling the maximum value of $N_{RE}$ in determining the TBS. Here, it was assumed that $Q_m$, R, v, and the like are given as parameters for determining the TBS. That is, it was assumed that $Q_m$, R, and v may be set without any major restrictions, in order to determine the TBS in the system.

In general, as time goes by, with the development of technology, various wired/wireless communication systems evolve while adopting technologies that were difficult to commercialize in the past. For example, in early 5G NR systems, the 256 QAM scheme, as a modulation scheme, with a modulation order of 8 had the highest modulation order, but in the future 5G NR systems, the 1024 QAM scheme with a modulation order of 10 may be supported due to the development of technology and the service requirements. In this case, the modulation order parameter Q, that determines the TBS is 10, and thus, when TBS Determination Method 1, TBS Determination Method 2, or TBS Determination Method 3 is applied as it is, the maximum value of TBS in an evolved 5G NR system will naturally increase regardless of whether TBoMS is applied. In a new system in which such an increase in the maximum value of a TBS does not matter, in a TBoMS mode, the TBS may be calculated or determined based on the newly added modulation order and TBS Determination Method 1, TBS Determination Method 2, or TBS Determination Method 3.

However, in a new 5G NR system in which, for a particular reason, a TBS is limited to a maximum value in determining the TBS, the number of PRBs has to be limited by limiting the modulation order $Q_m$ or considering the newly added highest modulation order.

The CQI indices and their interpretations are given in Table 5.2.2.1-2 or Table 5.2.2.1-4 for reporting CQI based on QPSK, 16QAM and 64QAM. The CQI indices and their interpretations are given in Table 5.2.2.1-3 for reporting CQI based on QPSK, 16QAM, 64QAM and 256QAM. Based on an unrestricted observation interval in time unless specified otherwise in this Clause, and an unrestricted observation interval in frequency, the UE shall derive for each CQI value reported in uplink slot n the highest CQI index which satisfies the following condition:

- A single PDSCH transport block with a combination of modulation scheme, target code rate and transport block size corresponding to the CQI index, and occupying a group of downlink physical resource blocks termed the CSI reference resource, could be received with a transport block error probability not exceeding:
  - 0.1, if the higher layer parameter cqi-Table in CSI-ReportConfig configures 'table1' (corresponding to Table 5.2.2.1-2), or 'table2' (corresponding to Table 5.2.2.1-3), or
  - 0.00001, if the higher layer parameter cqi-Table in CSI-ReportConfig configures 'table3' (corresponding to Table 5.2.2.1.4).

For example, Equation 8 may be modified to Equation 21 by setting the maximum value $Q_m^{max}$ of the maximum modulation order for the TBoMS mode.

$$N_{info} = N_{RE} \cdot R \cdot v \cdot \min(Q_m, Q_m^{max}).$$ Equation 21

Even in the case where an MCS table that is applicable to 1024 QAM as shown in Table 21 is introduced in the evolved 5G NR system, when it is predetermined or preset that $Q_m^{max}=8$, $N_{info}$ from Equation 21 does not exceed the maximum value of an existing 5G NR system. That is, even in the case where the MCS table indicated or set in higher layer signaling (e.g., pusch-Config or pdsch-Config) of the system is set to 1024 QAM (e.g., mcs-Table=qam1024), because the modulation order is limited to 8 or less, $N_{info}$ does not exceed the maximum value for $N_{info}$ of the existing 5G NR system, and consequently, the maximum value for a TBS also does not exceed the maximum value of a TBS of the existing system. (Here, it is assumed that $N_{RE}$ or $n_{PRB}^{max}$ corresponding thereto in Equation 21 is appropriately limited as in the method proposed in TBS Determination Method 3.)

TABLE 21

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 449 | 0.8770 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 517 | 3.0293 |
| 8 | 6 | 567 | 3.3223 |
| 9 | 6 | 616 | 3.6094 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3301 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

According to another embodiment of the disclosure, the new modulation order may be used as it is.

In order to use, in Equation 8, the modulation order configured by the system as it is, it is necessary to limit $N_{RE}$, $n_{PRB}$, or a parameter corresponding thereto, in a manner similar to TBS Determination Method 3. In other words, when $Q_m$ is less than or equal to the predetermined value of $Q_m^{max}$, values of $n_{PRB}^{max}$ are set based on the embodiments proposed in TBS Determination Method 3, and, when $Q_m > Q_m^{max}$, by limiting the value of $n_{PRB}^{max}$, the maximum value for $N_{info}$ is controlled not to exceed the maximum value for $N_{info}$ defined in the existing system.

As a simple example, there may be a method of adjusting $n_{PRB}^{max}$ based on the modulation order $Q_m$ set in the current system and the preset maximum modulation order $Q_m^{max}$ as shown in Equation 22.

(i) When $Q_m \leq Q_m^{max}$, $n_{PRB}^{max}$ is determined based on the embodiments proposed in TBS Determination Method 3.

(ii) When $Q_m > Q_m^{max}$, $n_{PRB}^{max}$ is adjusted as follows:

$$n_{PRB}^{max} \leftarrow \left\lfloor n_{PRB}^{max} \cdot \frac{Q_m^{max}}{Q_m} \right\rfloor,$$

In addition, (i) and (ii) may be combined to be variously expressed as a single expression, e.g., $$n_{PRB}^{max} \leftarrow \left\lfloor n_{PRB}^{max} \cdot \min\left(\frac{Q_m^{max}}{Q_m}, 1\right) \right\rfloor.$$ Equation 22

In Equation 22, $n_{PRB}^{max}$ may be a constant or a value determined based on at least one of FR1/FR2, the SCS and the channel bandwidth, or the number of slots, from various embodiments proposed in TBS Determination Method 3.

As a more particular example, a combination of the method of Equation 22 and the method of Equation 13 may be expressed as Equation 23.

$$N_{RB} = \min(156, N'_{RE}) \cdot$$ Equation 23

$$\min\left(\left\lfloor n_{PRB}^{max}(FR(i), \mu, BW_{FR(i)}(k)) \cdot \min\left(\frac{Q_m^{max}}{Q_m}, 1\right)\right\rfloor, n_{PRB}\right)$$

$$\left(\text{or, } N_{RE} = \min(156, N'_{RE}) \cdot\right.$$

$$\left.\min\left(\left\lfloor n_{PRB}^{max}(FR(i), SCS(j), BW(k)) \cdot \min\left(\frac{Q_m^{max}}{Q_m}, 1\right)\right\rfloor, n_{PRB}\right)\right)$$

$$i = 1, 2, j = 1, 2, 3, \ldots, k = 1, 2, 3, \ldots$$

Each parameter of $n_{PRB}^{max}(FR(i),\mu,BW_{FR(i)}(k))$ in Equation 23 may be excluded according to a condition for setting the maximum value of $n_{PRB}$ as in Equation 13.

When, as in Equation 16 to Equation 18, up to n slots through which one TB is transmitted are considered in Equation 22 and Equation 23, values related to $n_{PRB}^{max}$ may be applied as in Equation 24.

$$n_{PRB}^{max} \leftarrow n \times \left\lfloor \frac{n_{PRB}^{max} \cdot \min\left(\frac{Q_m^{max}}{Q_m}, 1\right)}{n} \right\rfloor,$$ Equation 24 or $$n \times \left\lfloor \frac{\left(n_{PRB}^{max}(FR(i), \mu, BW_{FR(i)}(k)) \cdot \min\left(\frac{Q_m^{max}}{Q_m}, 1\right)\right)}{(n)} \right\rfloor.$$

In addition, in a method similar to TBS Determination Method 3, based on at least one of parameters including not only FR1/FR2, the SCS, and the channel bandwidth, and the number of slots but also the modulation order, $N_{info} = N_{info}^{max}$ or $TBS^{max}$, which is the maximum value of a TBS, may be determined, and then the maximum value of the TBS may be adjusted. As a particular example, when $Q_m^{max}=8$, $TBS^{max}$ may be set to 1277992, which is the TBS value, or, when $TBS^{max}$ is determined according to the SCS, $TBS^{max}(\mu)$ corresponding to $n_{PRB}^{max}$ determined by Table 13 to Table 15 and $Q_m=8$ may be determined. In other words, as described in TBS Determination Method 3, $TBS^{max}$ may be a constant or a value determined by at least some of the parameters.

In conclusion, a UE may consider that, for $TBS^{max}$, which is a constant or a value determined based on at least one of FR1/FR2, the SCS, the channel bandwidth, or the number of slots, the case where the TBS is greater than $TBS^{max}$ does not occur. Alternatively, when, in determining the value of $n_{PRB}$ of Equation 7, the base station is always able to perform, based on $n_{PRB}^{max}$, the modulation order, and the like defined in Table 1 and Table 2 for FR1/FR2, SCSs, channel bandwidths and the like, configuration such that there is no case where $$n_{PRB} > n_{PRB}^{max} \left\lfloor n_{PRB}^{max}(FR(i), \mu, BW_{FR(i)}(k)) \cdot \min\left(\frac{Q_m^{max}}{Q_m}, 1\right)\right\rfloor,$$

the terminal may also consider (or expect) that there is no such case and apply the existing TBS determination method as it is. When up to n slots for transmission are considered and the base station is always able to perform configuration such that there is no case where $$n_{PRB} > n \times \left\lfloor \frac{n_{PRB}^{max}(FR(i), \mu, BW_{FR(i)}(k)) \cdot \min\left(\frac{Q_m^{max}}{Q_m}, 1\right)}{n}\right\rfloor,$$

the terminal may also consider (or expect) that there is no such case and apply the existing TBS determination method as it is. Of course, these methods are only examples, and, based on $n_{PRB}^{max}$ determined based on at least one of FR1/FR2, the SCS, the channel bandwidth, the possible number n of slots, or the modulation order through various methods, the terminal may consider (or expect) that there is no case where $$n_{PRB} > n_{PRB}^{max}\left(\text{or }\left\lfloor\frac{n_{PRB}^{max}}{n}\right\rfloor\right)$$

and apply the existing TBS determination method as it is. When the base station does not perform configuration such that $$n_{PRB} \leq n_{PRB}^{max}\left(\text{or }\left\lfloor\frac{n_{PRB}^{max}}{n}\right\rfloor\right)$$

is satisfied, a reception error may occur.

A method of adjusting the maximum value of a TBS based on at least one of FR1/FR2, an SCS, a channel bandwidth, the number of slots, or a modulation order is described above with reference to the embodiments of TBS Determination Method 3 and TBS Determination Method 4, but this is only an example, and a TBS may also be determined considering various additional conditions. In addition, it is also possible to adjust the maximum value of a TBS by limiting $n_{PRB}^{max}$ or a parameter corresponding thereto, or directly set and adjust the maximum value for the TBS. For example, when the code rate R, the number v of layers, or the like changes according to the evolution of the system, by applying, to Equation 8, $$R \leftarrow \min((R, R^{max}), v \leftarrow \min(v, v^{max}), \text{ or the like}$$

to adjust $N_{info}$, the maximum value of the TBS may be adjusted. Here, $R^{max}$ and $v^{max}$ denote the maximum code rate and the maximum number of layers preset in the system, respectively. Furthermore, $n_{PRB}^{max}$ may also be adjusted in this manner as in Equation 22 to Equation 24. In this case, $Q_m^{max}$ may also be applied to adjust $n_{PRB}^{max}$, or $n_{PRB}^{max}$ may be adjusted separately from $Q_m^{max}$.

The embodiments described in TBS Determination Method 3 and TBS Determination Method 4 may be applied independently, or may be appropriately combined with each other to be applied. In addition, although not particularly mentioned, both a transmitter and a receiver need to use the same TBS for transmitting and receiving data without errors, and accordingly, the above embodiments may be operated in the same manner in both the transmitter and the receiver.

In TBS Determination Method 3 and TBS Determination Method 4 described above, at least one of $R^{max}$, $v^{max}$, $n_{PRB}^{max}$, or $Q_m^{max}$ may be a value set by the base station for the terminal or a value reported by the terminal capability regardless of the value set by the base station. In the absence of both the terminal capability and the base station configuration, the terminal may consider predefined default values.

Hereinafter, an embodiment of the disclosure will be described regarding a method of determining a TBS for limited buffer rate matching (LBRM).

When one CB is input to an LDPC encoder, the CB may be output after parity bits are added thereto. In this case, the size of each of the parity bits may change according to an LDPC base graph. Depending on the rate matching scheme, all encoded bits generated by LPDC coding may be transmittable, or only some thereof may be transmittable. (However, in 5G NR, bits as much as 2*Z (here, Z is a lifting size) in the front among bits corresponding to information words or code blocks are not always transmitted regardless of rate matching. Of course, in other communication systems, some or all of the bits as much as 2*Z in the front may also be transmitted, and may be selected or excluded according to rate matching.)

A scheme of processing all encoded bits generated by LDPC coding so as to make the encoded bits to be transmittable is referred to as full buffer rate matching (FBRM), and a scheme of limiting the number of transmittable encoded bits is referred to as LBRM. When resources are allocated for data transmission, an output of the LDPC encoder is input to a circular buffer and a number of bits of the buffer corresponding to the size of the allocated resources are repeatedly transmitted.

When the length of the circular buffer is $N_{cb}$, and the number of all encoded bits generated by LDPC coding is N, in an FBRM scheme, $N_{cb}$=N. In an LBRM scheme, $N_{cb}$=min(N, $N_{ref}$) where $$N_{ref} = \left\lfloor\frac{TBS_{LBRM}}{C \cdot R_{LBRM}}\right\rfloor,$$

and $R_{LBRM}$ may be ⅔. The above-described method of determining a TBS may be used to determine $TBS_{LBRM}$. In this case, each parameter required for application of LBRM is described in the rate matching-related part of TS 38.212, which is the 5G NR standard, as follows:

TABLE 22

Bit selection

The bit sequence after encoding $d_0, d_1, d_2, \ldots, d_{N-1}$, from Clause 5.3.2 is written into a circular buffer of length $N_{cb}$ for the r-th coded block, where N is defined in Clause 5.3.2. For the r-th code block, let $N_{cb} = N$ if $I_{LBRM} = 0$ and $N_{cb} = \min(N, N_{ref})$ otherwise, where $$N_{ref} = \left\lfloor \frac{TBS_{LBRM}}{C \cdot R_{LBRM}} \right\rfloor, R_{LBRM} = 2/3, TBS_{LBRM} \text{ is determined according to Clause 6.1.4.2 in}$$

[6, TS 38.214] for UL-SCH and Clause 5.1.3.2 in [6, TS 38.214] for DL-SCH/PCH, assuming the following:
- maximum number of layers for one TB for UL-SCH is given by X, where
  - if the higher layer parameter maxMIMO-Layers of PUSCH-ServingCellConfig of the serving cell is configured, X is given by that parameter
  - elseif the higher layer parameter maxRank of pusch-Config of the serving cell is configured, X is given by the maximum value of maxRank across all BWPs of the serving cell
  - otherwise, X is given by the maximum number of layers for PUSCH supported by the UE for the serving cell
- maximum number of layers for one TB for DL-SCH/PCH is given by the minimum of X and 4, where
  - if the higher layer parameter maxMIMO-Layers of PDSCH-ServingCellConfig of the serving cell is configured, X is given by that parameter
  - otherwise, X is given by the maximum number of layers for PDSCH supported by the UE for the serving cell
- if the higher layer parameter mcs-Table-r17 given by a pdsch-Config for at least one DL BWP of the serving cell is set to 'qam1024', maximum modulation order $Q_m = 10$ is assumed for DL-SCH, elseif the higher layer parameter mcs-Table given by a pdsch-Config for at least one DL BWP of the serving cell is set to 'qam256', maximum modulation order $Q_m = 8$ is assumed for DL-SCH; else a maximum modulation order $Q_m = 6$ is assumed for DL-SCH;
- if the higher layer parameter mcs-Table or mcs-TableTransformPrecoder given by a pusch-Config or configuredGrantConfig for at least one UL BWP of the serving cell is set to 'qam256', maximum modulation order $Q_m = 8$ is assumed for UL-SCH; otherwise a maximum modulation order $Q_m = 6$ is assumed for UL-SCH
- maximum coding rate of 948/1024;
- $n_{PRB} = n_{PRB,LBRM}$ is given by Table 5.4.2.1-1, where the value of $n_{PRB,LBRM}$ for DL-SCH is determined according to the initial downlink bandwidth part if there is no other downlink bandwidth part configured to the UE;
- $N_{RE} = 156 \cdot n_{PRB}$;

In Table 22, 'Table 5.4.2.1-1' denotes Table 23.

TABLE 23

| Maximum number of PRBs across all configured DL BWPs and UL BWPs of a carrier for DL-SCH and UL-SCH, respectively | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

According to the LBRM process, when LBRM for a PDSCH is applied, there may be a case where $n_{PRB}=n_{PRB,LBRM}$ and $N_{RE}=156 \cdot n_{PRB}$. Accordingly, when one TBoMS is applied to the PDSCH, the maximum value of a TBS may increase compared to a communication system in which the 256 QAM modulation scheme corresponds to the highest modulation order. Thus, values of $n_{PRB,LBRM}$ may also be changed by applying various embodiments described in TBS Determination Method 3 and TBS Determination Method 4. As a particular example, it may be configured that $Q_m^{max}=8$, and $$n_{PRB,LBRM} \leftarrow \left\lfloor n_{PRB,LBRM} \cdot \min\left(\frac{Q_m^{max}}{Q_m}, 1\right) \right\rfloor$$

or $$n_{PRB,LBRM} \leftarrow n \times \left\lfloor \frac{n_{PRB,LBRM} \cdot \min\left(\frac{Q_m^{max}}{Q_m}, 1\right)}{n} \right\rfloor$$

Of course, this is only an example, and when TBoMS is applied, the value may be defined as other values less than or equal to a value of $n_{PRB,LBRM}$ defined in Table 23 (at least one of them is less than the value), and may also be determined by at least one parameter of FR1/FR2, the SCS, the channel bandwidth, the number of slots, the modulation order, the code rate, or the number of layers.

In a wireless communication system according to various embodiments of the disclosure, the max data rate supported by a terminal may be determined based on Equation 25.

Equation 25 data rate (in Mbps) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)}) \right)$$

In Equation 25, J denotes the number of carriers grouped by carrier aggregation (CA), Rmax=948/1024, $v_{Layers}^{(j)}$ denotes the maximum number of layers of a carrier of index j, $Q_m^{(j)}$ denotes the maximum modulation order of the carrier of index j, $f^{(j)}$ denotes a scaling factor of the carrier of index j, and μ denotes an SCS. $f^{(j)}$ may be 1, 0.8, 0.75, or 0.4, and may be reported by a terminal, and μ may be given as shown in Table 24.

TABLE 24

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Here, $T_s^\mu$ denotes the average length of OFDM symbols, and may be calculated according to $$T_s^\mu = \frac{10^{-3}}{14 \cdot 2^\mu}, \text{ and } N_{PRB}^{BW(j),\mu}$$

denotes the maximum number of RBs in $BW^{(j)}$. $OH^{(j)}$ denotes an overhead value, and may be given as 0.14 in a DL and 0.18 in a UL of FR1 (e.g., a band of 6 GHz or 7.125 GHz or less), and may be given as 0.08 in a DL and 0.10 in a UL of FR2 (e.g., a band of 6 GHz or 7.125 GHz or greater). According to Equation 25, the max data rate in a DL in a cell having a 100 MHz frequency bandwidth at a 30 kHz subcarrier spacing may be calculated as shown in Table 25.

TABLE 25

| $f^{(j)}$ | $V_{Layers}^{(j)}$ | $Q_m^{(j)}$ | Rmax | $N_{PRB}^{BW(j),\mu}$ | $T_x^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

Meanwhile, the actual data rate of a terminal, which may be measured in actual data transmission, may be a value obtained by dividing the amount of data by the data transmission time. This may be a value obtained by dividing a TBS in 1 TB transmission or a sum of TBSs in 2 TB transmission by the TTI length. For example, the actual max data rate in a DL in a cell having a 100 MHz frequency bandwidth at a 30 kHz subcarrier spacing may be determined as shown in Table 26 according to the number of allocated PDSCH symbols.

TABLE 26

| $N_{symb}^{sh}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The max data rate supported by the terminal may be identified in Table 9, and the actual data rate according to the allocated TBS may be identified in Table 26. At this time, the actual data rate may be greater than the max data rate depending on scheduling information.

In a wireless communication system, in particular, in an NR system, a data rate supportable by a terminal may be agreed between a base station and the terminal. The data rate may be calculated by using the maximum frequency band, the maximum modulation order, the maximum number of layers, which are supported by the terminal. However, the calculated data rate may be different from a value calculated according to the TBS and the TTI length of a TB used for actual data transmission. Accordingly, a case may occur in which a terminal is allocated a TBS greater than the value corresponding to the data rate supported by the terminal itself, and, to prevent this case from occurring, a restriction on schedulable TBSs according to the data rate supported by the terminal may be required. It may be necessary to minimize the occurrence of such a case and define an operation of the terminal in the above case. In addition, when LBRM is applied in a communication system defined in current NR, $TBS_{LBRM}$ is determined based on the number of layers or rank supported by a terminal.

Figure 11:
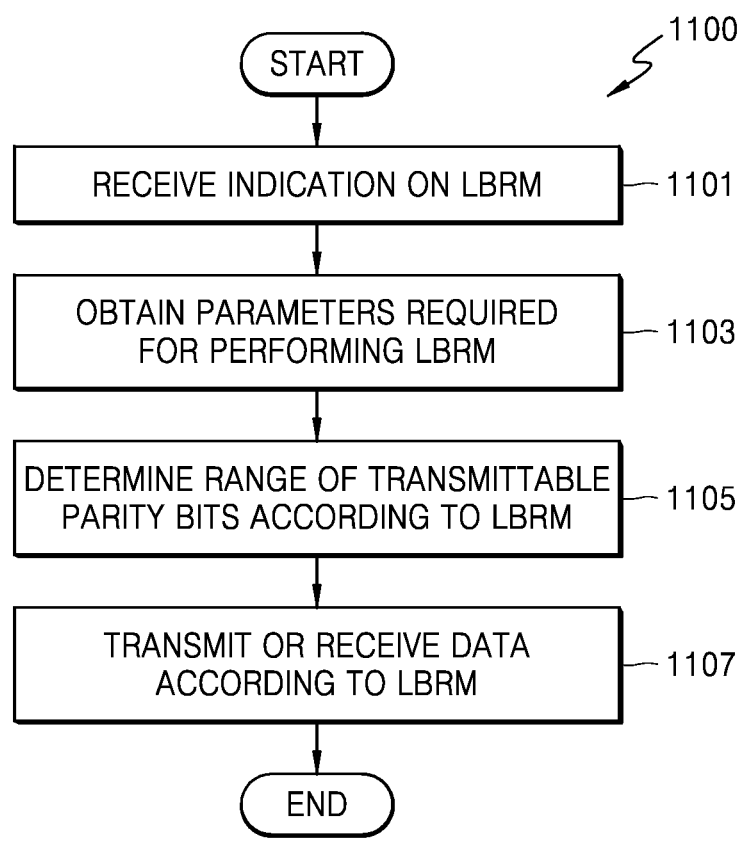
FIG. 11 is a flowchart of a terminal for transmitting or receiving data in a wireless communication system, according to an embodiment of the disclosure.

FIG. 11 is a flowchart 1100 of a terminal for transmitting or receiving data in a communication system, according to an embodiment of the disclosure. FIG. 11 illustrates an operating method of the terminal 120.

Referring to FIG. 11, in operation 1101, the terminal receives an indication on LBRM. The indication on LBRM may be included in information for configuring a channel (e.g., a PUSCH or a PDSCH) used to transmit or receive data. For example, the information for configuring a channel may be received through an RRC message. For example, LBRM may be enabled by a parameter 'rateMatching' in PUSCH-ServingCellConfig.

In operation 1103, the terminal obtains parameters required for performing LBRM. The parameters for performing LBRM may include at least one of one or more parameters for calculating a TBS, or a code rate. In addition, the parameters for calculating a TBS may include at least one of the maximum number of layers or a band combination applied for performing CA.

Figure 12:
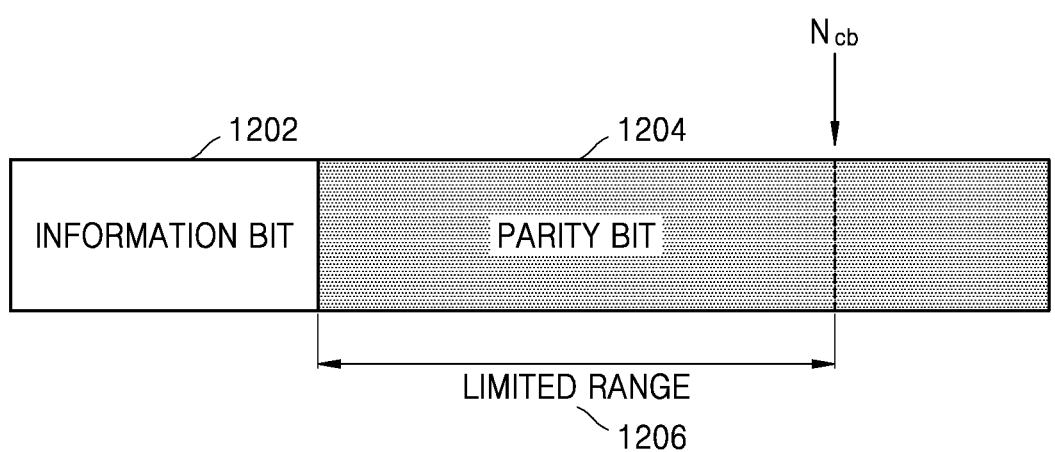
FIG. 12 illustrates an example of a range of transmittable bits according to limited buffer rate matching (LBRM) in a wireless communication system, according to an embodiment of the disclosure.

In operation 1105, the terminal determines a range of transmittable encoded bits according to LBRM. The encoded bits refer to bits encoded for a bit sequence in which a CRC is added to a TB or a CB, and may be referred to as an LDPC codeword. LBRM is a scheme of treating some of encoded bits as transmissible bits and transmitting at least one buffer of the transmissible bits on a channel. For example, as illustrated in FIG. 12, information bits 1202 and bits within a limited range 1206 indicated by Ncb among parity bits 1204 generated from the information bits 1202 are transmittable, and the remaining bits are not transmitted even when a redundancy version (RV) is changed. Accordingly, the terminal may determine which range of encoded bits is to be treated as transmittable or receivable bits. Treating as transmittable bits may be performed by inputting the corresponding bits into a circular buffer. In 5G NR, bits as much as 2*Z (here, Z is a lifting size) in the front among bits corresponding to information words or code blocks are not always transmitted regardless of rate matching. (i.e., they are always excluded from transmission.) Of course, in other communication systems, the bits as much as 2*Z in the front may also be transmitted, and may be selected or excluded according to rate matching.

In operation 1107, the terminal transmits or receives data according to LBRM. In other words, in performing encoding or decoding, the terminal performs encoding or decoding considering encoded bits within a limited range. In DL communication, the terminal may operate a buffer having a size corresponding to the limited range in order to buffer received data. In UL communication, the terminal may generate parity bits by encoding an information bit, and include, in transmission data, a part of the information bit or at least one parity bit selected within the limited range from among the generated parity bits.

Reference to FIG. 11, the terminal may perform LBRM. In order to perform LBRM, the terminal determines a limited range for encoded bits. To this end, it is required to determine a parameter (e.g., a band combination or the maximum number of layers applied for performing CA) required to determine the limited range.

The above various embodiments of the disclosure have been described focusing on the operation of the terminal. However, in order for a base station to perform encoding or decoding employing LBRM, the base station may also perform the same parameter configuration operation as that performed by the terminal, and then perform encoding or decoding. In this case, the operation of the base station is similar to the operations of the terminal described above. In addition, it is apparent that various combinations of the PUSCH-LBRM method and the PDSCH-LBRM operation proposed in the disclosure may be applied as an LBRM method of a base station and a terminal. In other words, in using the above-described rate matching schemes considering LBRM for successful decoding, both the base station and the terminal or both the transmitter and the receiver have to maintain the same configuration or the agreed configuration. At this time, it is apparent that various combinations of the configurations mentioned in the disclosure are possible.

In general, LBRM may affect performance because some of encoded bits may not be transmitted due to a buffer constraint. For this reason, the base station or the terminal may set the MCS such that LBRM is rarely applied or is minimized. For example, when a TBS is calculated for each MCS and then scheduling for each MCS is performed, the base station or the terminal may determine whether to apply LBRM and then may not use the MCS to which LBRM is determined to be actually applied. In other words, the base station or the terminal may use one MCS among MCSs to which LBRM is not applied. In some cases, even when LBRM is applied, in order to minimize the effect thereof, the base station or the terminal may set, as the final MCS, a relatively high or highest MCS among the MCSs to which LBRM is applied. Here, the determination of whether to apply LBRM may be performed by comparing N with $N_{ref}$ for each MCS. For example, LBRM may be applied when $N>N_{ref}$ and may not be applied otherwise.

As described above, the method of controlling the application of LBRM through MCS configuration may be differently applied according to a stand-alone (SA) operation or a non-stand alone (NSA) operation in a system beyond 5G. In a communication system or a network to which an SA operation scheme is applied, the application of LBRM may be controlled through MCS configuration, whereas, in a communication system or a network to which an NSA operation scheme is applied, the control of whether to apply LBRM through MCS configuration may not be applied. On the contrary, in a communication system or a network to which an NSA operation scheme is applied, the application of LBRM may be controlled through MCS configuration, whereas, in a communication system or a network to which an SA operation scheme is applied, the control of whether to apply LBRM through MCS configuration may not be applied. In addition, although the application of LBRM is controlled through MCS configuration for both SA and NSA operation schemes, detailed rules may be configured differently to each other. Here, the SA operation denotes that a first cellular network (e.g., a legacy network) and a second cellular network (e.g., a 5G network) are operated independently, and the NSA operation denotes that the first cellular network and the second cellular network are connected to each other and operated. That the two networks are connected and operated means that at least one network controls the operation of the other network.

FIG. 12 illustrates an example of a range of transmittable bits according to limited buffer rate matching (LBRM) in a wireless communication system, according to an embodiment of the disclosure.

Methods according to claims or embodiments described in the specification of the disclosure may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs include instructions that cause the electronic device to execute the methods according to the embodiments described in claims or the specification of the disclosure.

The programs (e.g., software modules or software) may be stored in nonvolatile memory including random-access memory (RAM) or flash memory, read-only memory (ROM), electrically erasable programmable ROM (EEPROM), a magnetic disc storage device, a compact disc-ROM (CD-ROM), a digital versatile disc (DVD) or other optical storage device, or a magnetic cassette. Alternatively, the programs may be stored in memory including a combination of some or all of the above-mentioned storage media. In addition, a plurality of such memory units may be included.

Also, the programs may be stored in an attachable storage device accessible through any or a combination of communication networks such as the Internet, an intranet, a local area network (LAN), a wide LAN (WLAN), or a storage area network (SAN). The storage device may access, via an external port, a device for performing an embodiment of the disclosure. Furthermore, a separate storage device on a communication network may access the device for performing an embodiment of the disclosure.

An apparatus and a method according to various embodiments of the disclosure may perform efficient transmission and reception of a TB by setting a limited maximum TBS in transmission of one TB through a plurality of slots.

In addition, the apparatus and the method according to various embodiments of the disclosure may effectively perform rate matching on a TB or a CB by using limited encoded bits.

The effects that may be obtained by the disclosure are not limited to the above-mentioned effects, and other effects that are not mentioned herein may be clearly understood by one of skill in the art from the following description.

In the embodiments of the disclosure described above, the elements included in the disclosure have been expressed in the singular or plural form according to the suggested embodiments of the disclosure. However, the expression in the singular or plural form is appropriately selected according to the suggested situations for convenience of explanation and is not intended to limit the disclosure to the single or plural elements, and even when a certain element is expressed in the plural form, it may be provided with a single element, and even when a certain element is expressed in the singular form, it may be provided with a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
    transmitting, to a base station, capability information of the UE; and
    receiving configuration information associated with a transport block size (TBS),
    wherein the TBS is determined based on a value of $N_{RE} \cdot R \cdot Q_m \cdot v$,
    wherein the $N_{RE}$ corresponds to a number of allocated resource elements, the R corresponds to a code rate, and the $Q_m$ corresponds to a modulation order, and the v corresponds to a number of allocated layers,
    wherein a maximum value of the TBS is considered for transport block over multiple slots (TBoMS),
    wherein the maximum value of the TBS is determined by limiting at least one of a value of the $N_{RE}$, the $Q_m$, or the v,
    wherein a maximum value of the $N_{RE}$ is determined based on a maximum value of the $n_{PRB}$, and
    wherein the $n_{PRB}$ corresponds to a number of PRBs allocated to a physical downlink shared channel (PDSCH) in a slot.

2. The method of claim 1, wherein a maximum value of the $N_{RE}$ is determined based on at least one of a frequency or a subcarrier spacing.

3. The method of claim 2,
    wherein the $N_{RE}$ corresponds to min 156, $N_{RE}'$)·$n_{PRB}$,
    wherein the $N_{RE}'$ corresponds to $N_{sc}^{RB}$. $N_{symb}^{sh} - N_{DMRS}^{PRB} - N_{oh}^{PRB}$, and
    wherein the $N_{sc}^{RB}$ corresponds to a number of number of subcarriers included in one resource block, $N_{symb}^{sh}$ corresponds to a number of orthogonal frequency division multiplexing (OFDM) symbols allocated to the PDSCH, then $N_{DMRS}^{PRB}$ corresponds to a number of resource elements included in one physical resource block (PRB), and the $N_{oh}^{PRB}$ corresponds to a number of resource elements occupied by overhead in the one PRB.

4. A user equipment (UE) in a wireless communication system, the UE comprising:
    a transceiver; and
    at least one processor coupled with the transceiver and configured to:
        transmit, to a base station, capability information of the UE; and
        receive configuration information associated with a transport block size (TBS), and
    wherein the TBS is determined based on a value of $N_{RE} \cdot R \cdot Q_m \cdot v$,
    wherein the $N_{RE}$ corresponds to a number of allocated resource elements, the R corresponds to a code rate, and the $Q_m$ corresponds to a modulation order, and the v corresponds to a number of allocated layers,
    wherein a maximum value of the TBS is considered for transport block over multiple slots (TBoMS),
    wherein the maximum value of the TBS is determined by limiting at least one of a value of the $N_{RE}$, the $Q_m$, or the v,
    wherein a maximum value of the $N_{RE}$ is determined based on a maximum value of the $n_{PRB}$, and
    wherein the $n_{PRB}$ corresponds to a number of PRBs allocated to a physical downlink shared channel (PDSCH) in a slot.

5. The UE of claim 4, wherein a maximum value of the $N_{RE}$ is determined based on at least one of a frequency or a subcarrier spacing.

6. The UE of claim 5,
    wherein the $N_{RE}$ corresponds to min (156, $N_{RE}'$)·$n_{PRB}$,
    wherein the $N_{RE}'$ corresponds to $N_{sc}^{RB}$. $N_{symb}^{sh} - N_{DMRS}^{PRB} - N_{oh}^{PRB}$, and
    wherein the $N_{sc}^{RB}$ corresponds to a number of subcarriers included in one resource block, the $N_{symb}^{sh}$ corresponds to a number of orthogonal frequency division multiplexing (OFDM) symbols allocated the PDSCH, the $N_{DMRS}^{PRB}$ corresponds to a number of resource elements included in one physical resource block (PRB), and the $N_{oh}^{PRB}$ corresponds to a number of resource elements occupied by overhead in the one PRB.

7. A method performed by a base station in a wireless communication system, the method comprising:
    receiving, from a user equipment (UE), capability information of the UE; and
    transmitting configuration information associated with a transport block size (TBS), and
    wherein the TBS is determined based on a value of $N_{RE} \cdot R \cdot Q_m \cdot v$,
    wherein the $N_{RE}$ corresponds to a number of allocated resource elements, the R corresponds to a code rate, and the $Q_m$ corresponds to a modulation order, and the v corresponds to a number of allocated layers,
    wherein a maximum value of the TBS is considered for transport block over multiple slots (TBoMS),
    wherein the maximum value of the TBS is determined by limiting at least one of a value of the $N_{RE}$, the $Q_m$, or the v,
    wherein a maximum value of the $N_{RE}$ is determined based on a maximum value of the $n_{PRB}$, and
    wherein the $n_{PRB}$ corresponds to a number of PRBs allocated to a physical downlink shared channel (PDSCH) in a slot.

8. The method of claim 7, wherein a maximum value of the $N_{RE}$ is determined based on at least one of a frequency or a subcarrier spacing.

9. The method of claim 8,
wherein the $N_{RE}$ corresponds to min (156, $N_{RE}'$)·$n_{PRB}$,
wherein the $N_{RE}'$ corresponds to $N_{sc}^{RB}$·$N_{symb}^{sh}$−$N_{DMRS}^{PRB}$−$N_{oh}^{PRB}$, and
wherein the $N_{sc}^{RB}$ corresponds to a number of subcarriers included in one resource block, the $N_{symb}^{sh}$ corresponds to a number of orthogonal frequency division multiplexing (OFDM) symbols allocated the PDSCH, the $N_{DMRS}^{PRB}$ corresponds to a number of resource elements included in one physical resource block (PRB), and $N_{oh}^{PRB}$ the corresponds to a number of resource elements occupied by overhead in the one PRB.

10. A base station in a wireless communication system, the base station comprising:
a transceiver; and
at least one processor coupled with the transceiver and configured to:
receive, from a user equipment (UE), capability information of the UE; and
transmit configuration information associated with a transport block size (TBS),
wherein the TBS is determined based on a value of $N_{RE}$·R·$Q_m$·v,
wherein the $N_{RE}$ corresponds to a number of allocated resource elements, the R corresponds to a code rate, and the $Q_m$ corresponds to a modulation order,
and the v corresponds to a number of allocated layers,
wherein a maximum value of the TBS is considered for transport block over multiple slots (TBoMS),
wherein the maximum value of the TBS is determined by limiting at least one of a value of the $N_{RE}$, the $Q_m$, or the v,
wherein a maximum value of the $N_{RE}$ is determined based on a maximum value of the $n_{PRB}$, and
wherein the $n_{PRB}$ corresponds to a number of PRBs allocated to a physical downlink shared channel (PDSCH) in a slot.

11. The base station of claim 10, wherein a maximum value of the $N_{RE}$ is determined based on at least one of a frequency or a subcarrier spacing.

12. The base station of claim 11,
wherein the $N_{RE}$ corresponds to min (156, $N_{RE}'$)·$n_{PRB}$,
wherein the $N_{RE}'$ corresponds to $N_{sc}^{RB}$·$N_{symb}^{sh}$−$N_{DMRS}^{PRB}$−$N_{oh}^{PRB}$,
wherein the $N_{sc}^{RB}$ corresponds to a number of subcarriers included in one resource block, the $N_{symb}^{sh}$ corresponds to a number of orthogonal frequency division multiplexing (OFDM) symbols allocated to the PDSCH, the $N_{DMRS}^{PRB}$ corresponds to a number of resource elements included in one physical resource block (PRB), the $N_{oh}^{PRB}$ corresponds to a number of resource elements occupied by overhead in the one PRB.

* * * * *